(12) United States Patent
Childs

(10) Patent No.: US 7,128,195 B2
(45) Date of Patent: Oct. 31, 2006

(54) WORKPIECE TRANSFER SYSTEM FOR STAMPING PRESS

(75) Inventor: Montgomery W. Childs, Oro Station (CA)

(73) Assignee: Linear Transfer Systems Ltd., Ontario (CA)

( * ) Notice: Subject to any disclaimer, the term of this patent is extended or adjusted under 35 U.S.C. 154(b) by 0 days.

(21) Appl. No.: 10/805,787

(22) Filed: Mar. 22, 2004

(65) Prior Publication Data

US 2005/0205390 A1 Sep. 22, 2005

(51) Int. Cl.
*B21D 43/05* (2006.01)
*B21B 39/00* (2006.01)

(52) U.S. Cl. .............. 198/339.1; 198/346.3; 72/405.12; 72/405.13; 72/405.16

(58) Field of Classification Search ............. 198/339.1, 198/346.3; 72/405.12, 405.13, 405.16
See application file for complete search history.

(56) References Cited

U.S. PATENT DOCUMENTS

| | | | |
|---|---|---|---|
| 4,032,018 A | 6/1977 | Wallis | |
| 4,577,748 A | 3/1986 | Boegner et al. | |
| 4,887,446 A * | 12/1989 | Maher | 72/20.2 |
| 5,307,666 A | 5/1994 | Bianchi | |
| 5,584,205 A * | 12/1996 | Harsch et al. | 72/405.02 |
| 5,640,875 A | 6/1997 | Horde et al. | |
| 5,680,787 A * | 10/1997 | Fisch | 72/405.16 |
| 5,868,655 A | 2/1999 | Hofele | |
| 5,983,696 A | 11/1999 | Maher | |
| 6,185,979 B1 * | 2/2001 | Schollhammer | 72/405.16 |
| 6,314,786 B1 | 11/2001 | Hofele et al. | |
| 6,338,264 B1 | 1/2002 | Harsch et al. | |
| 6,910,362 B1 * | 6/2005 | Childs et al. | 72/405.16 |

FOREIGN PATENT DOCUMENTS

| | | |
|---|---|---|
| CA | 2348656 | 11/2002 |
| DE | 43 10 057 A1 | 9/1994 |

OTHER PUBLICATIONS

Advertisement entitled "Introducing the Wayne Trail Bi-Directional Transfer System" published in Metalforming Magazine, issued at least as early as Mar. 2003.
Leaflet entitled "Front & Rear FR-Class Servo Transfer" published by Linear Transfer Systems Ltd. at least as early as Mar. 21, 2003.
Leaflet entitled "Touch Screen Interface & Tooling Technology" published by Linear Transfer Systems Ltd. at least as early as Mar. 21, 2003.
Leaflet entitled "Class A, B & C Transfer Presses Titan Series" published by Linear Transfer Systems Ltd. at least as early as Mar. 21, 2003.
Leaflet entitled "Through the Window W-Class Servo Transfer" published by Linear Transfer Systems Ltd. at least as early as Mar. 21, 2003.

* cited by examiner

*Primary Examiner*—Gene O. Crawford
*Assistant Examiner*—Mark A. Deuble
(74) *Attorney, Agent, or Firm*—Gifford, Krass, Groh, Sprinkle, Anderson & Citkowski, P.C.

(57) ABSTRACT

A transfer system for transferring workpieces between successive die stations in a stamping press employing elongate bars with workpiece grippers mounted thereon. Two elongate support beams are mounted on vertical primary supports on opposite sides of the press. Two mounting heads are mounted on each beam and are horizontally movable thereon. Each head is independently movable and is connectible by one elongate bar to either the mounting head on the same beam or to an opposing mounting head mounted on the other beam, the choice dependent on the workpiece flow direction.

18 Claims, 16 Drawing Sheets

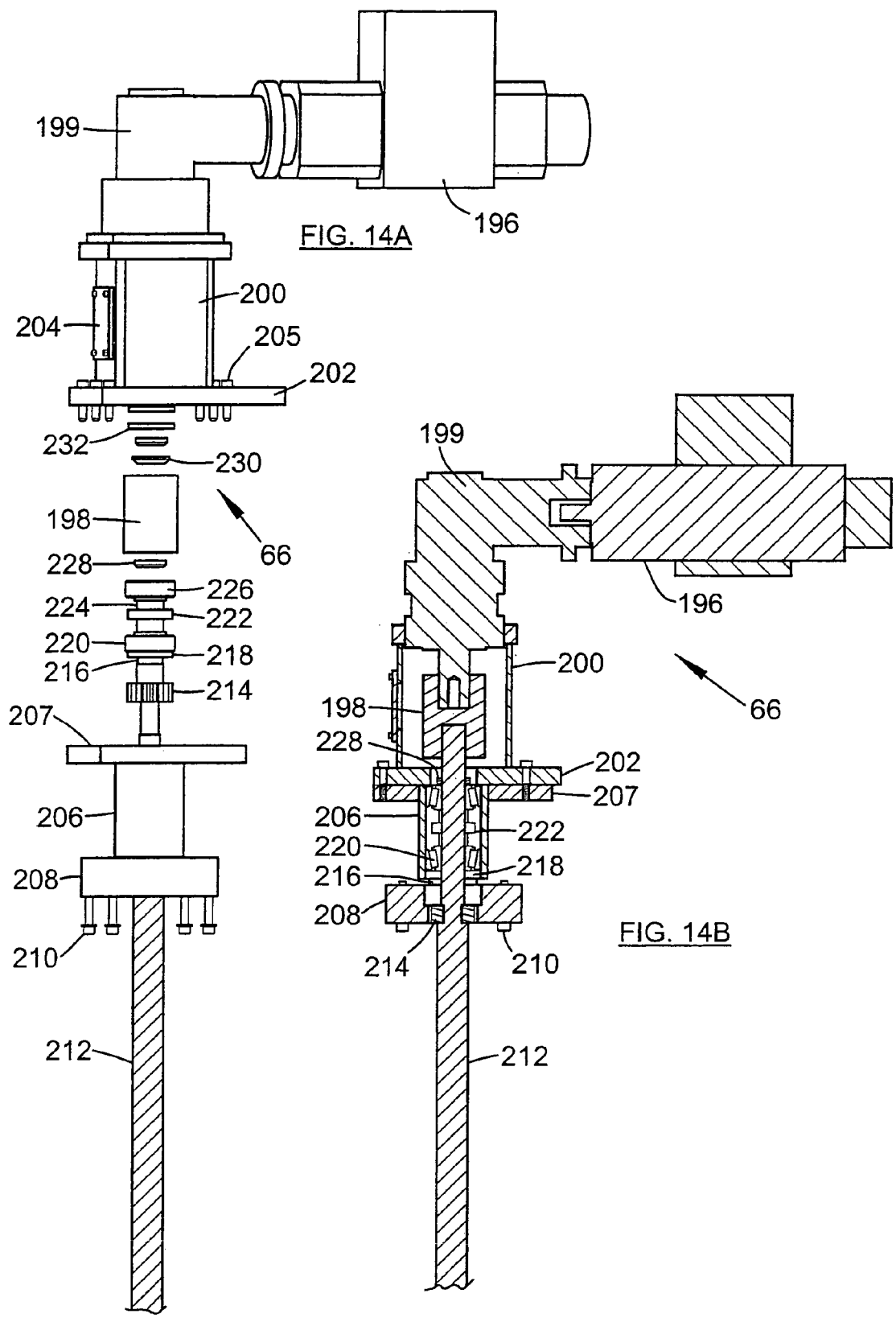

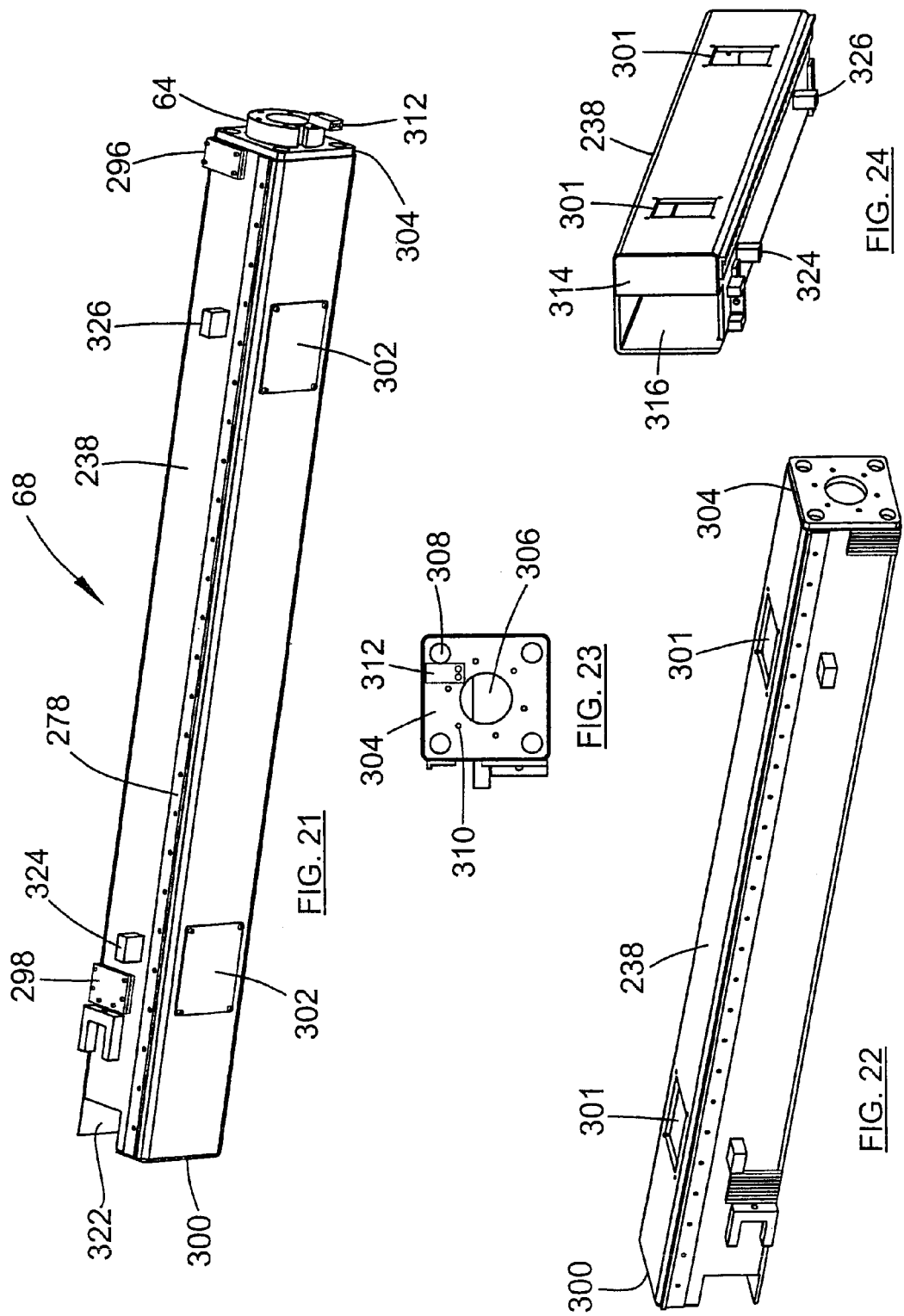

WORKPIECE TRANSFER SYSTEM FOR STAMPING PRESS

BACKGROUND OF THE INVENTION

This invention relates to transfer systems for transferring workpieces between successive die stations in a stamping press and also to a carriage component for use in such systems.

The manufacturing industry, and in particular the metal fabrication and stamping industries, commonly utilize automated systems that allow a workpiece to be conveyed or transferred between equally spaced workstations where particular operations are carried out. For example, many metal parts on automobiles and appliances are formed by means of a stamping procedure employing a series of dies that are situated on a number of aligned and equally spaced workstations within the bed of a transfer press. The part is formed progressively from a workpiece upon each stroke of the press. Automated transfer systems are typically employed to grasp the workpiece, remove it from one set of dies and then transport the workpiece laterally through the press bed to the next adjacent workstation where it will be stamped a second time with a further set of dies upon the next stroke of the press.

A press transfer system utilized in conjunction with a typical multi-stage press commonly includes at least one transversely oriented transfer rail situated adjacent to the press bed and aligned with the various workstations. Depending upon the particular application and the press layout, a single transfer rail may be positioned along one side of the press bed or, alternatively, a separate transfer rail may be located on each side of the bed of the press. Regardless, the primary function of the transfer rail is to provide a mechanism by which tools, generally referred to as grippers or fingers, may be supported adjacent to the workstations and moved to allow a workpiece to be grasped and transported to the next workstation.

Movement of workpieces from workstation to workstation involves the movement of the transfer rail in what usually amounts to a relatively complex three-dimensional manner. Described generally, this movement involves (i) moving the rail toward the workstation such that the grippers or fingers may grasp the workpiece (referred to as movement in the Y-axis direction); (ii) lifting the rail upwardly to remove the workpiece from the dies of a particular workstation (referred to as movement in the Z-axis direction); (iii) moving the rail longitudinally and parallel to the press bed to align the workpieces with the next adjacent workstation (referred to as movement in the X-axis direction; (iv) lowering the rail to allow the grippers to place the workpieces onto the next adjacent set of dies (Z-axis movement); (v) retracting the rail from the workstation (Y-axis movement) to extract the grippers from the press bed so they are not damaged with the next stroke of the press; and, finally, returning back to the starting position (X-axis movement).

The primary reason for utilizing a press transfer system in fabrication and stamping operations is to maximize production efficiency by increasing the throughput of a production line. A press and its related equipment in a stamping or fabrication facility represent a significant capital investment for a manufacturer. In order to maximize the return on that investment there is a desire to maintain presses in continuous operation and to maximize the number of workpieces moving through the press over a given length of time. As a result others have devoted a considerable amount of effort into the design of transfer rails and the mechanical, hydraulic and/or pneumatic systems that drive transfer rails in the complex three-dimensional manner described above.

Most transfer systems are limited to one direction of part flow. Prior to purchasing a transfer system, generally the manufacturer must consider which direction of part flow is required and choose the transfer system accordingly. In left-right part flow, the size of the parts that can be stamped and transferred is limited by the width (front-back) of the bed of the press or the corresponding window between press columns, whichever is smaller. Press beds are normally rectangular in shape, having their left-right width significantly greater in size than the front-back width, allowing for a greater number of progressive stations in left-right part flow, relative to front-back. In front-back part flow, the left-right width of the workstation can be significantly larger than for left-right part flow workstations which allows for parts with large blank widths (left-right) to be used. Because the bed is rectangular in shape and the front-back width is smaller than the left-right width, the number of progressive stations that can fit on the bed in this direction is limited.

In summary, if the manufacturer chooses to purchase a transfer system for left-right part flow, the maximum allowable size of the blanks to be formed will be limited by the front-back width of the press bed or corresponding column window. If the manufacturer chooses to purchase a transfer system for front-back part flow, the maximum allowable size blanks to be formed will be significantly increased with respect to maximum size in the left-right part flow direction, but the number of progressive workstations will be limited by the smaller front-back width of the press bed.

U.S. Pat. No. 4,577,748 which issued Mar. 25, 1986 to M. S. Willett, Inc. describes a transfer system that has transfer bars mounted on a frame which moves longitudinally as a unit. The bars move transversely on the frame. A drive box mounted on a side of the frame has transverse and longitudinal drive levers. The longitudinal drive lever has a roller which slides in a transverse track in one of the transfer bars to drive the frame forward and rearward and the transverse drive lever is pivotably connected to a link which is pivotably connected to a pivotably mounted crank arm. There are also carriages movable along upwardly and outwardly slanted slide assemblies mounted on the transfer bars. However, this known transfer apparatus is only designed to move the workpieces through the workstations in the left-right flow direction relative to the press.

U.S. Pat. No. 4,887,446 which issued Dec. 19, 1989 to J. H. Maher also describes a system for transferring workpieces through a series of linearly aligned workstations. The workpieces are transferred along an X-axis by a plurality of workpiece gripping fingers mounted on a transfer rail. Independently supported actuator units are provided which have a lateral arm to support the transfer rail and to impart up and down and back and forth movement to it. The transfer mechanism can be coordinated with operation of the press. However, in this known system, the individual actuator units are simply floor mounted by means of castors which permit each unit to be moved when required. Again, this transfer system is only set up for a left-right flow of the workpieces from one workstation to the next.

According to one aspect of the present invention, it is one object of the invention to provide a transfer system which employs four mounting heads that are independently movable on two support beams and that are each selectively connectible by means of a bar to another of the mounting heads for the purpose of transferring the workpieces either in a left-right flow direction or in a front-back flow direction relative to the press.

According to another aspect of the invention, it is another object of the invention to provide a transfer system that includes at least one improved mounting head horizontally movable on a horizontal support beam, this improved mounting head including a coupling for detachably connecting a mounting bar for supporting workpiece grippers, a lateral transfer mechanism for moving the coupling in a front-back direction and a vertical transfer mechanism for moving the coupling vertically.

According to yet another aspect of the invention, it is an object of the invention to provide an improved carriage apparatus for use in a transfer system, this carriage apparatus including a primary carriage body adapted for mounting on a horizontally extending support beam for substantially horizontal movement, a secondary support body mounted for vertical movement on the carriage body, and an elongate support member mounted for substantially horizontal movement on the secondary support body in a front-back direction relative to the press during use of the transfer system.

SUMMARY OF THE INVENTION

According to one aspect of the invention, there is provided a transfer system for transferring workpieces between successive die stations in a stamping press having a left side, a right side, a front side and a back side, and including at least one elongate bar having a series of workpiece grippers mounted thereon for engaging workpieces at the successive die stations. A primary support arrangement is provided and is adapted for mounting adjacent the stamping press. Two elongate support beams are mounted on the primary support arrangement and positioned on first and second opposite sides of the press during use of the transfer system. Two mounting heads are mounted on each of these support beams and are horizontally movable on their respective support beam. Each mounting head is independently movable on its respective support beam and is selectively connectible by means of one of the at least one elongate bar to either the other mounting head mounted on the same support beam for the purpose of transferring the workpieces in a left-right flow direction relative to the press or an opposing one of the mounting heads mounted on the other support beam for the purpose of transferring the workpieces in a front-back flow direction relative to the press. Each mounting head includes a coupling for detachably connecting one of the at least one bar to the mounting head, a vertical transport mechanism for moving the coupling vertically, and a lateral transport mechanism for moving the coupling in front-back direction relative to the press. The transfer system also includes longitudinal transport drive systems for moving each of the mounting heads in a left-right direction relative to the press.

Preferably there are four of the longitudinal transport drive systems, one for each of the mounting heads and each longitudinal transport drive system comprises a belt drive assembly including a primary drive belt mounted on the support beam for the respective mounting head and extending in a lengthwise direction of the support beam. A drive motor is mounted on its respective mounting head and has an output shaft operatively connected to a drive pulley that engages the primary drive belt.

According to another aspect of the invention, there is provided a transfer system for transferring workpieces between successive die stations in a stamping press having left and right sides, a front side and a back side, this transfer system including a substantially horizontal support beam adapted for placement adjacent one of the sides of the press. There is also provided a supporting structure for the support beam which is adapted for mounting on this supporting structure. At least one mounting head is mounted on the support beam for horizontal movement along the support beam. An elongate bar is adapted for mounting substantially horizontally on the at least one mounting head and is adapted to support a series of workpiece grippers for engaging workpieces at the successive die stations. The or each mounting head includes a coupling for detachably connecting the elongate bar to the mounting head, a lateral transport mechanism for moving the coupling in a front-back direction relative to the press, and a vertical transport mechanism for moving the coupling vertically. The transfer system also has a longitudinal transport drive system for the or each mounting head capable of moving the or each mounting head independently of any other mounting heads, if any, in a left-right direction relative to the press.

Preferably, the vertical transport mechanism includes a supporting body mounted for vertical movement on the support beam and the lateral transport mechanism includes a horizontally extending, elongate support member mounted for substantially horizontal movement on the supporting body.

According to a further aspect of the invention, there is provided a carriage apparatus for use in a transfer system for transferring workpieces between successive die stations in a stamping press having a left side, a right side and front and back sides. The carriage apparatus includes a primary carriage body adapted for mounting on a horizontally extending support beam for substantially horizontal movement along the support beam in a left-right direction relative to the press. A primary drive mechanism is provided to move the carriage body selectively in the left-right direction, this primary drive mechanism including a carriage drive motor mounted on the carriage body. A secondary support body is mounted for vertical movement on the carriage body and a secondary drive assembly is connected to this support body and is adapted to move the support body vertically relative to the carriage body. A horizontally extending, elongate support member is mounted for substantially horizontal movement on the secondary support body in a front-back direction relative to the press and has an inner end that can be moved away from the secondary support body and towards the stamping press during use of the apparatus. A coupling is provided at the inner end for connecting an elongate bar for mounting a series of workpiece holders. A power drive system is connected to the elongate support member and is adapted to move this support member horizontally relative to the secondary support body.

Preferably the secondary support body is an L-shaped housing having a vertical housing section and a horizontal housing section rigidly connected to each other. The elongate support body is slidably mounted in the horizontal housing section.

According to yet another aspect of the invention, there is provided a carriage apparatus for use in a transfer system for transferring workpieces between successive die stations in a stamping press. The apparatus includes a primary carriage body adapted for mounting on a horizontally extending support for substantially horizontal movement on the support in a left-right direction relative to the press during use of the carriage apparatus. A secondary support body is mounted for vertical movement on the carriage body and a secondary drive assembly is connected to the secondary support body and is adapted to move this support body vertically relative to the carriage body. A horizontally extending, elongate support member is mounted for substantially horizontal movement on the secondary support body in a front-back direction relative to the press and has an inner end that can be moved away from the secondary support body and towards the stamping press. A coupling is provided at this inner end for connecting an elongate bar for mounting a series of workpiece holders. There is also a belt drive assembly adapted to move the elongate support member horizontally relative to the secondary support body. This belt drive assembly includes a drive belt connected to the elongate support member. A drive motor is mounted on the secondary support body at a location spaced above the elongate support member and a drive pulley is operatively connected to the drive motor for rotation thereby and engages the drive belt. The drive pulley is rotatable about a horizontal axis that is perpendicular to a longitudinal axis of the elongate support member.

Further features, advantages and enhancements will become apparent from the following detailed description taken in conjunction with the accompanying drawings.

BRIEF DESCRIPTION OF THE DRAWINGS

FIG. 14A is a separated parts view of a ballscrew-type drive assembly used to move vertically a supporting body of the mounting head on the carriage assembly of FIG. 12 while FIG. 14B is an axial cross-section of the assembled ball screw drive assembly;

FIG. 21 is a perspective view of a left side, elongate support member of the mounting head, this support member being used for lateral transport in the front-back direction and the view being taken from above and showing one vertical side of the support member;

FIG. 22 is another perspective view of the support member of FIG. 21, this view showing the bottom side of the support member and its inner end on which an attachment mechanism for a transfer bar can be mounted;

FIG. 23 is an end view of the elongate support member of FIG. 21, this view showing the right or inner end; and FIG. 24 is another perspective view of the elongate support member, this view showing the right side, the bottom and the outer end.

DETAILED DESCRIPTION OF PREFERRED EMBODIMENTS

Figure 1:
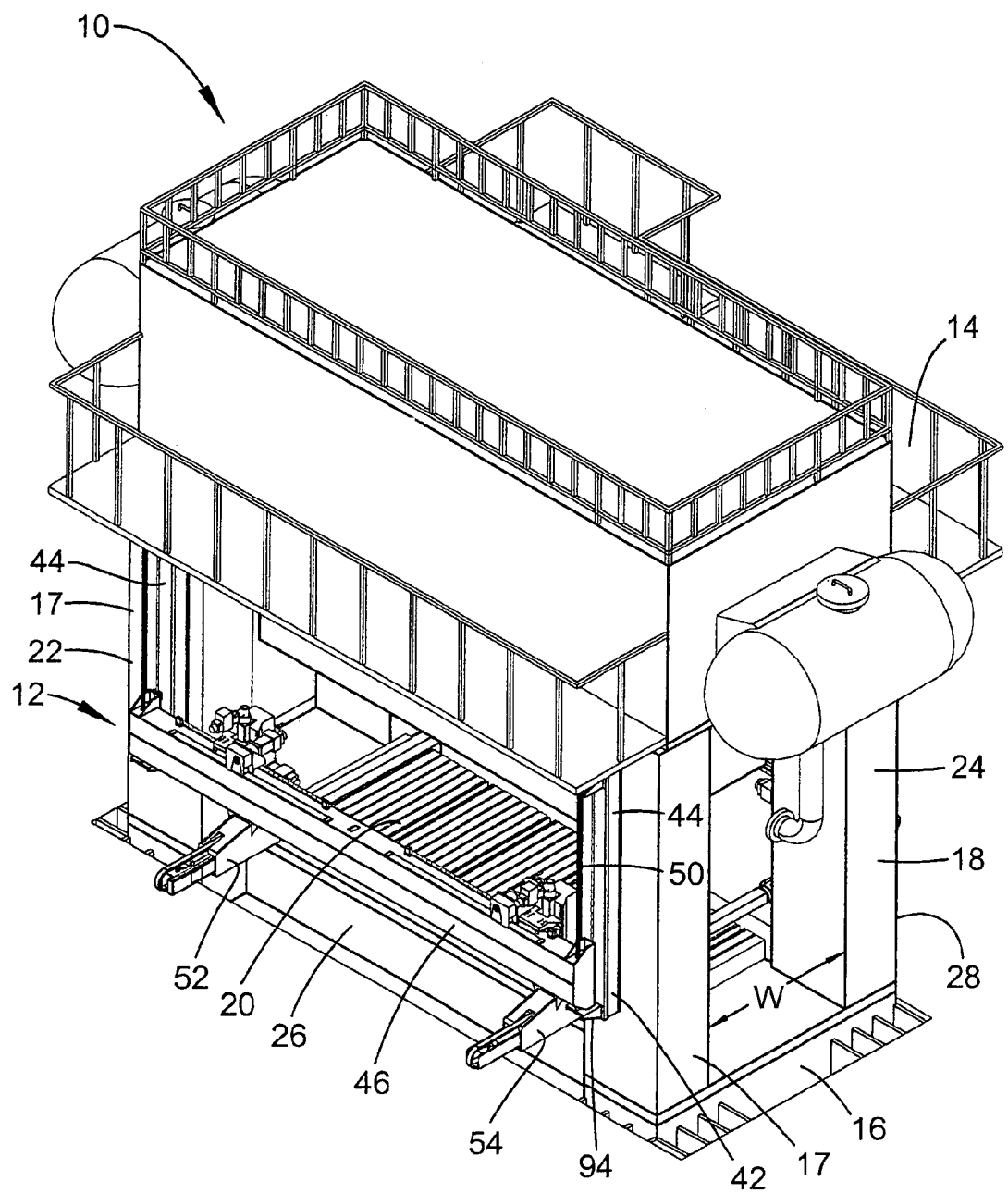
FIG. 1 is a perspective view of a stamping press equipped with a transfer system constructed in accordance with the invention, this view taken from above and showing the front and right sides of the press.
Figure 2:
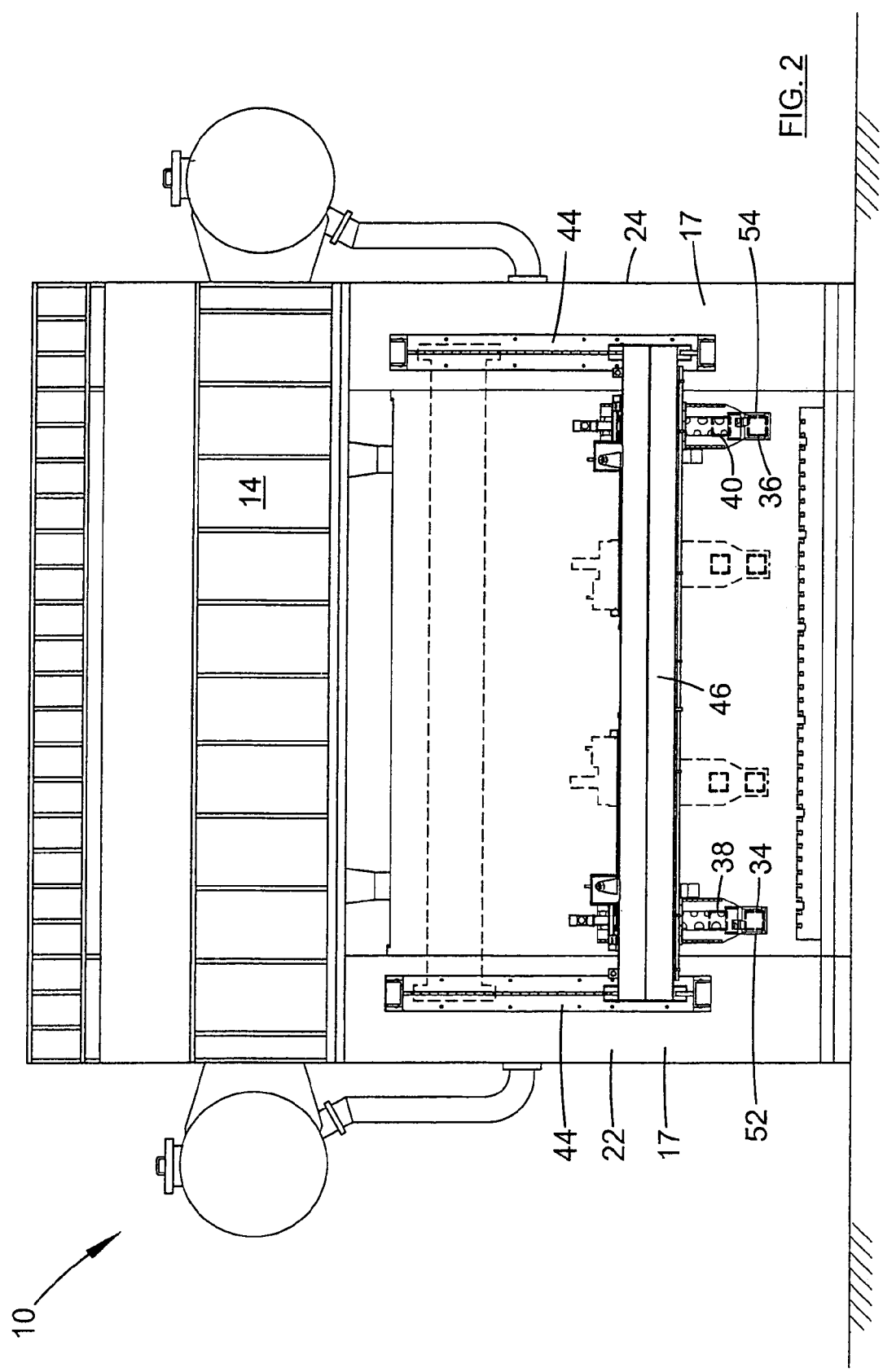
FIG. 2 is a front view of the stamping press and transfer system of FIG. 1, this view showing the two front mounting heads at their outermost position while also showing these two heads at an inner position in outline only, the two transfer bars being arranged for front to back transfer of workpieces.
Figure 3:
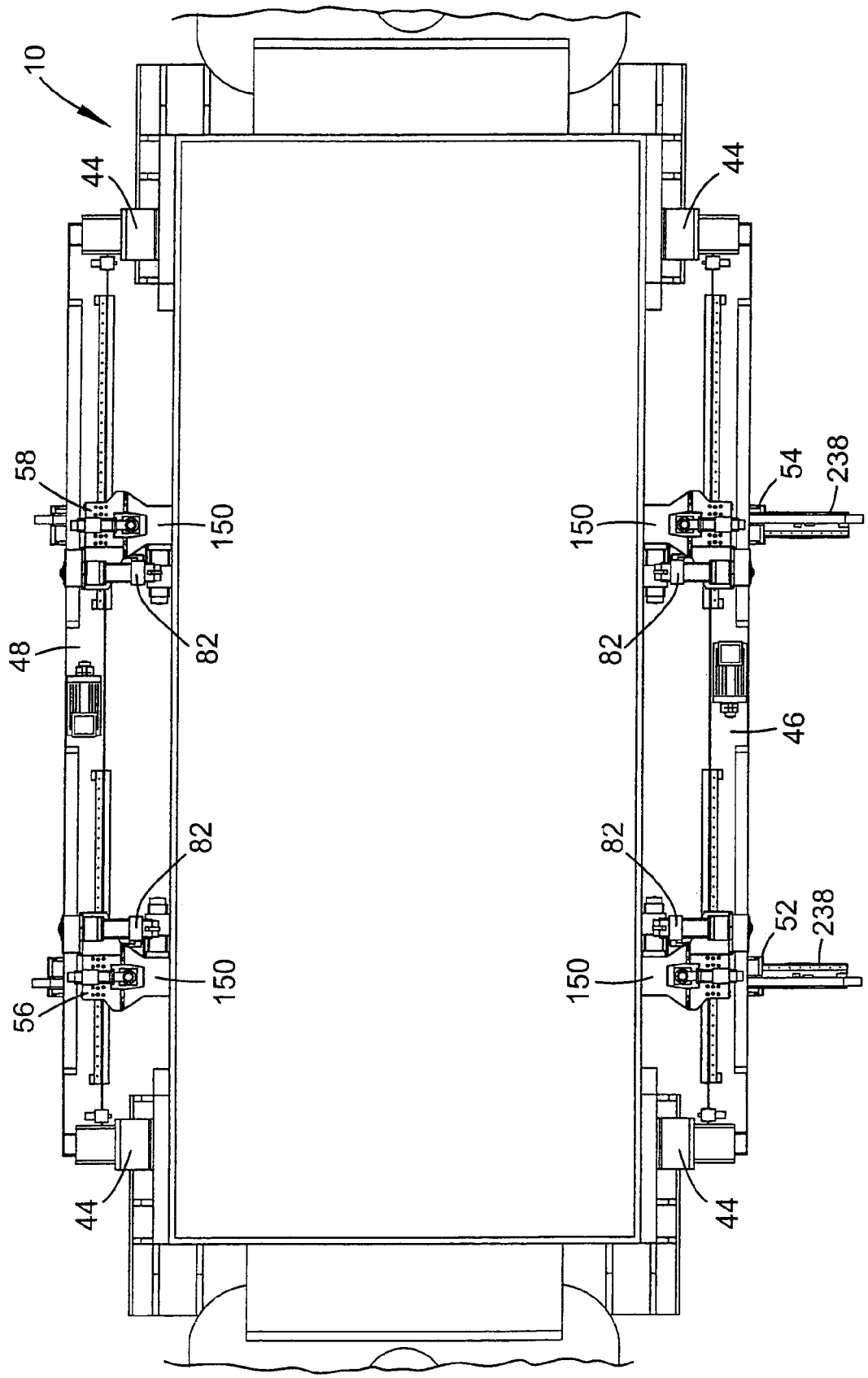
FIG. 3 is a top view of the stamping press and transfer system of FIGS. 1 and 2 but the mezzanine of the press has been omitted for illustration sake.

Illustrated in FIGS. 1 to 3 is a stamping press 10, the construction of which is per se known in the stamping press industry. This stamping press is fitted with a transfer system 12 constructed in accordance with the invention, this system being able to transfer workpieces between successive die stations in the press. An example of such a known press is the Model 2000T Jinan Toledo Press which has a bolster measuring 240 inches by 96 inches and a stroke of 30 inches. The press shown in FIG. 1 is equipped with a mezzanine 14 which has been omitted from FIG. 3. The press includes a main base support 16 at each end. Extending upwardly from each base support are two steel pillars 17 and 18 which can be made, for example, from large structural steel I-beams or wide flange beams. A series of die stations (not shown) are arranged in a row or rows on a bolster 20 between the pillars 17, 18 at left side 22 and right side 24 of the press. The press, which is generally rectangular in plan view, has a front side 26 and a rear or back side 28. It is known to transfer parts between successive die stations by means of either a left-right part flow or a front-back part flow. When used herein, the term "left-right part flow" refers to and includes a flow of parts either in the left to right direction of the press, that is from the left side 22 towards the right side 24, or in the right to left direction of the press. Similarly, the expression "front-back part flow" when used herein shall refer to and include part flow that is either from the front side 26 towards the rear side 28 or in the opposite rear to front direction where the context permits.

In front-back part flow, the left-right width of each work station can be significantly larger than for left-right part flow workstations and this allows for parts with large widths (left-right) or lengths to be used.

Figure 8:
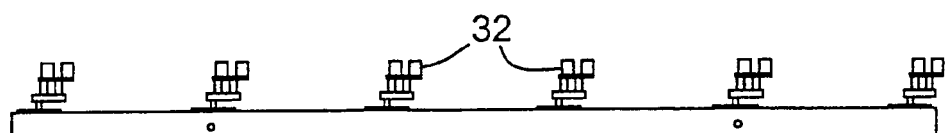
FIG. 8 is a top view of an elongate transfer bar having a series of workpiece grippers or fingers mounted thereon.
Figure 9:
FIG. 9 is a side view of the transfer bar of FIG. 8.

In order to transfer the parts or workpieces between the work stations using a transfer system, the system is equipped with at least one transfer rail situated adjacent to the press bed and aligned with the various work stations. One of these transfer rails 30 is illustrated in FIGS. 8 and 9. It will be appreciated that the length of each transfer rail can vary depending upon the size of the press and the direction of part flow. The transfer rail is equipped with a series of workpiece grippers or fingers 32 which are of standard or custom construction and which are mounted either directly on the transfer rail as shown or indirectly. These grippers can be equally spaced along the length of the transfer rail and, in use, they project inwardly towards the press bed. The grippers can be operated pneumatically, if desired. In addition to providing support for the grippers or fingers, which can also be described as workpiece holders, each transfer rail can be maneuvered by the transfer system along with its grippers in order to allow a workpiece to be grasped and transported to the next workstation. Instead of mounting the grippers directly on the transfer rail, it is also known to provide a secondary tooling rail that is in some manner secured or attached to the transfer rail and the transfer system of this invention includes this variation.

The transfer system 12 illustrated in FIGS. 1 to 3 is a front to back configuration. This system has two elongate transfer rails or bars that extend parallel to each other in the front-back direction. The ends of these two bars in their uppermost and lowermost positions is outlined in dash lines in FIG. 2. The ends of the bars in their lowermost position is indicated at 34 and 36 and in their uppermost position is indicated at 38 and 40. The bars are hollow and can contain pneumatic lines to feed pressurized air to the grippers.

The main components of a preferred form of the transfer system will now be described. There is a primary support arrangement indicated generally at 42 for mounting adjacent the stamping press. Preferably, this primary supporting arrangement comprises four vertical, elongate beam supporting posts 44, each adapted for mounting to or adjacent to the stamping press, in particular the columns or pillars 17, 18 of the press. As shown, each preferred beam-supporting post is a box-like column or tubular member that is rigidly and firmly attached to its respective adjacent press pillar, for example by being bolted thereto.

There are two elongate support beams 46 and 48 movably mounted on the posts 44 and positioned on first and second opposite sides of the stamping press 10 during use of the transfer system. These first and second opposite sides are preferably the front side 26 and the rear side 28 as shown. Each end of each support beam is movably mounted on a respective one of the beam supporting posts 44 and there is a vertical drive unit indicated generally at 50 at each end of each support beam for moving its respective support beam upwardly or downwardly as required. Preferably each vertical drive unit 50 includes a jackscrew fixedly mounted on a respective one of the beam supporting posts 44 and a screw jack that rotatably engages the jackscrew. The advantage of this movable beam arrangement is that the working components of the transfer system including each beam can be retracted up and out of the way to provide easy access for die change over and tooling adjustment.

Figure 4:
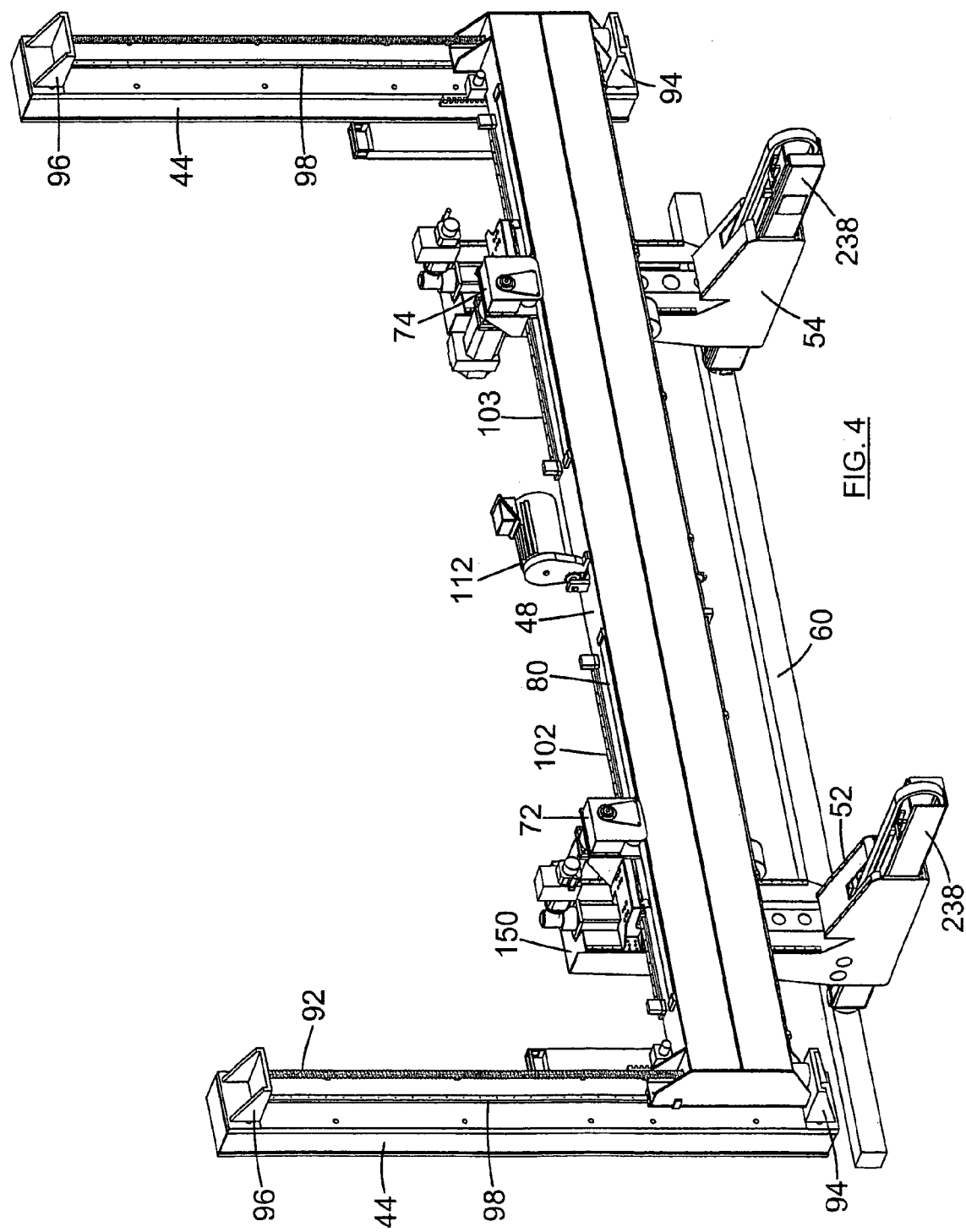
FIG. 4 is a perspective view of the front section of a transfer system constructed in accordance with the invention, this view showing a long transfer bar or rail connected to the two front mounting heads for left-right part flow.
Figure 5:
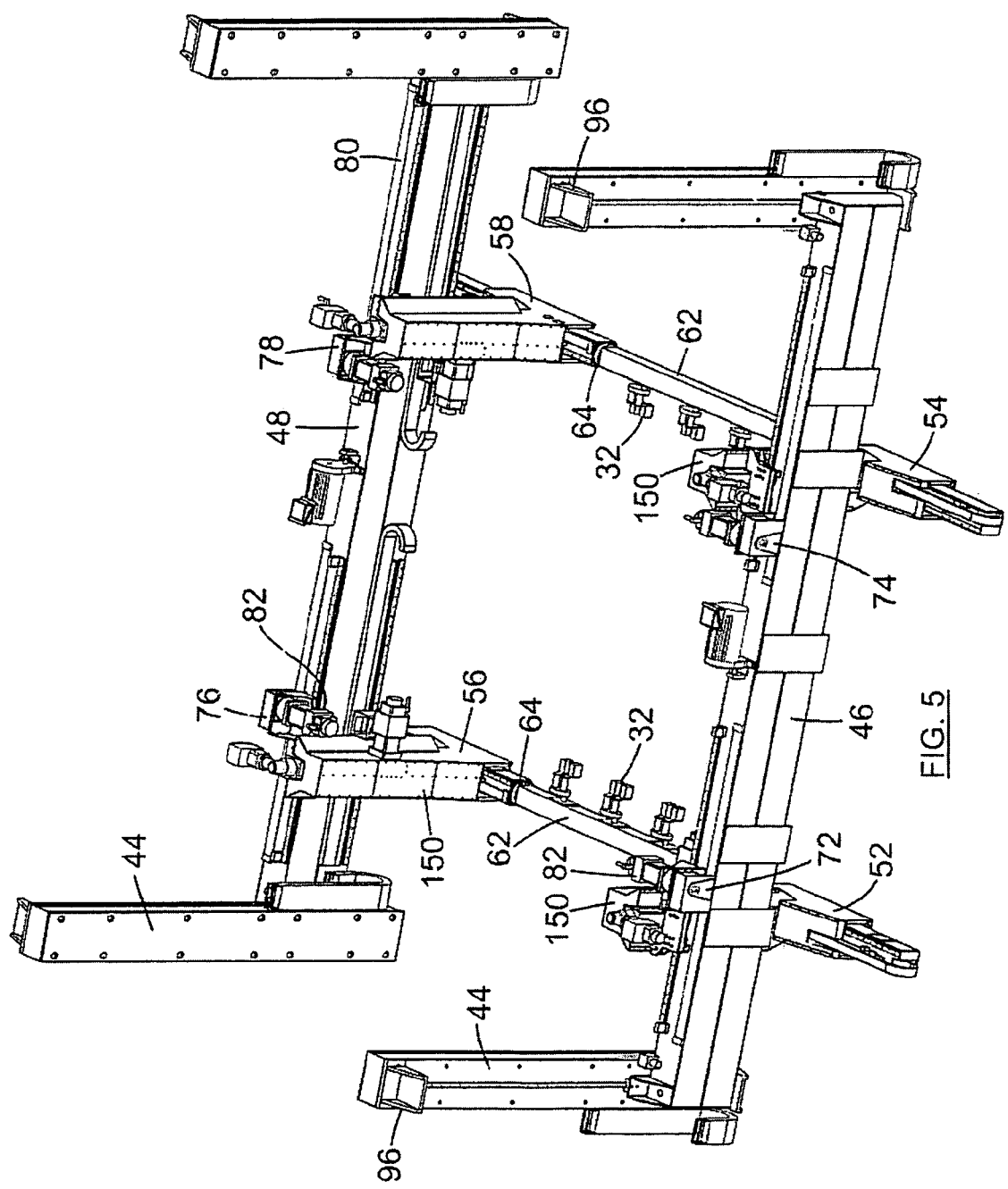
FIG. 5 is another perspective view of a transfer system seen from above with two elongate transfer bars connecting opposing mounting heads for front-back part flow.

Preferably, two mounting heads 52, 54 are mounted on the front support beam 46 and are horizontally movable on this beam and two further mounting heads 56, 58 are mounted on the rear support beam 48 that are horizontally movable on this beam. Although two mounting heads on each beam are preferred, it is also possible to construct a transfer system employing aspects of the invention with only one mounting head mounted on a single support beam for horizontal movement or, alternatively, a transfer system having two independent mounting heads located on opposite sides of the press and each mounted on its own support beam for horizontal movement. Each mounting head in the preferred embodiment of FIGS. 1 to 3 is independently movable on its respective support beam and is selectively connectible by means of one of the aforementioned transfer bars or rails 30 to either the other mounting head mounted on the same support beam for the purpose of transferring the workpieces in a left-right flow direction relative to the press or an opposing one of the mounting heads mounted on the other support beam for the purpose of transferring the workpieces in a front-back flow direction relative to the press. Shown in FIG. 4 is a long transfer bar or rail 60 which is connected to the two mounting heads 52, 54 mounted on the front support beam 46. It will be appreciated that a similar, long transfer bar can be mounted in the same manner on the rear mounting heads 56, 58 on the opposite side of the press. The transfer bar arrangement of FIG. 4 is for left-right part flow whereby workpieces are transferred between successive die stations. Shown in FIG. 5 are two, parallel transfer bars or rails 62 that are connected to opposing mounting heads for front-back part flow. Thus, one bar 62 extends between the two opposing mounting heads 52, 56 and is connected thereto by means of couplings 64. Each coupling 64 preferably detachably connects its end of the bar 62 to the adjacent mounting head.

The preferred transfer system 12 employs mounting heads each of which has a vertical transport mechanism for moving the coupling 64 of the head vertically. As explained further hereinafter, a preferred vertical transport mechanism 66 is shown in a blown-apart form in FIG. 14A and comprises a ballscrew drive assembly which is mounted on its respective mounting head. Also, each mounting head has a lateral transport mechanism for moving the coupling in a front-back direction relative to the press, this mechanism 68 being shown in part in FIG. 7. The preferred lateral transport mechanism includes a belt-drive assembly employing a drive belt 70 and an elongate support member 238.

Figure 13:
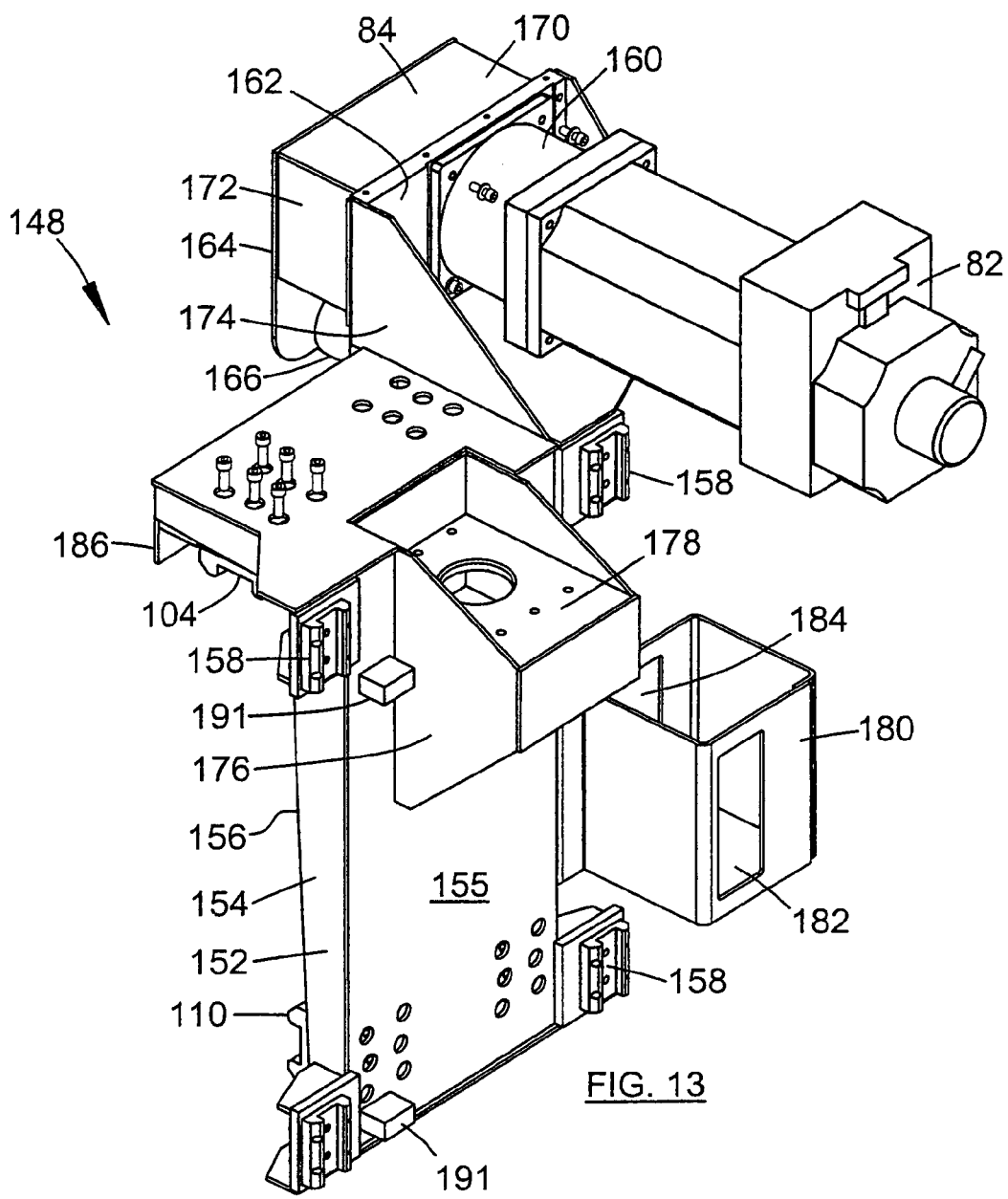
FIG. 13 is another perspective view of the carriage assembly of FIG. 12, this view being taken from above and showing the rear and right sides of the assembly.
Figure 12:
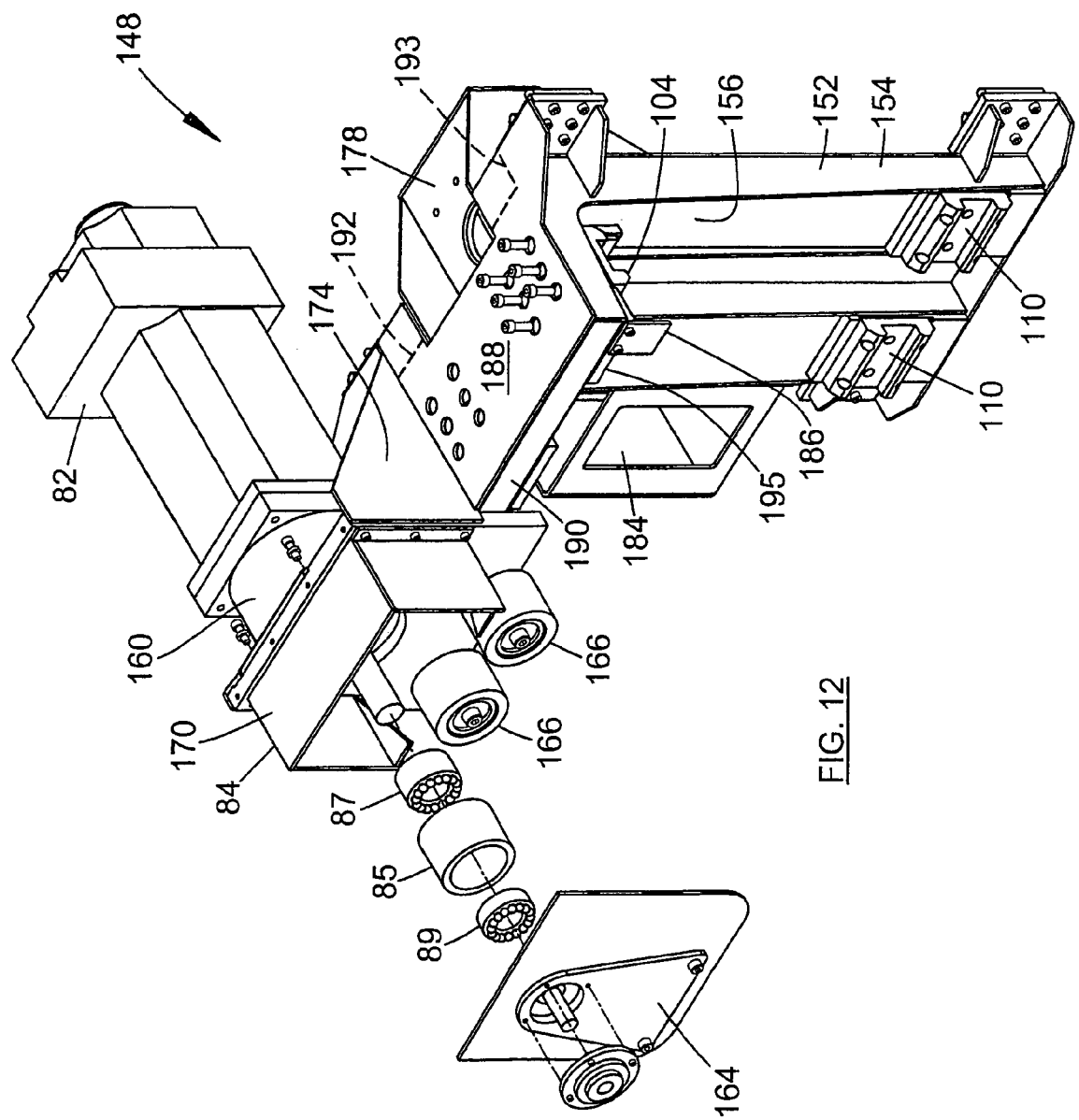
FIG. 12 is a perspective view of a righthand carriage assembly which is a major component of the mounting head, this view showing certain drive pulley components in separated manner and being taken from above and showing the front and right sides of the assembly.

The preferred transfer system 12 also includes longitudinal transport drive system for moving each of the mounting heads 52–58 in a left-right direction relative to the press. The front two longitudinal drive systems are indicated generally at 72 and 74 in FIG. 4. All four longitudinal drive systems of the preferred embodiment including rear longitudinal drive systems 76, 78 are visible in FIG. 5. It will be understood that these four longitudinal transport drive systems 72, 74, 76, 78 allow each of the mounting heads 52, 54, 56, 58 to be independently movable on its respective support beam. Of course, in a transfer system having only one mounting head on each beam, there would be only one longitudinal transfer drive system connected to each beam for moving its respective mounting head. The preferred, illustrated longitudinal transport drive system for each head comprises a belt drive assembly including a primary drive belt 80 which is mounted on the support beam for the respective mounting head and extends generally in the lengthwise direction of this support beam as shown. Also, each belt drive assembly includes a drive motor 82 which can be seen clearly in FIGS. 12 and 13, is mounted on its respective mounting head, and has the usual output shaft operatively connected to a drive pulley 85. The pulley 85 is located within pulley housing 84 and engages the primary drive belt 80.

Figure 10:
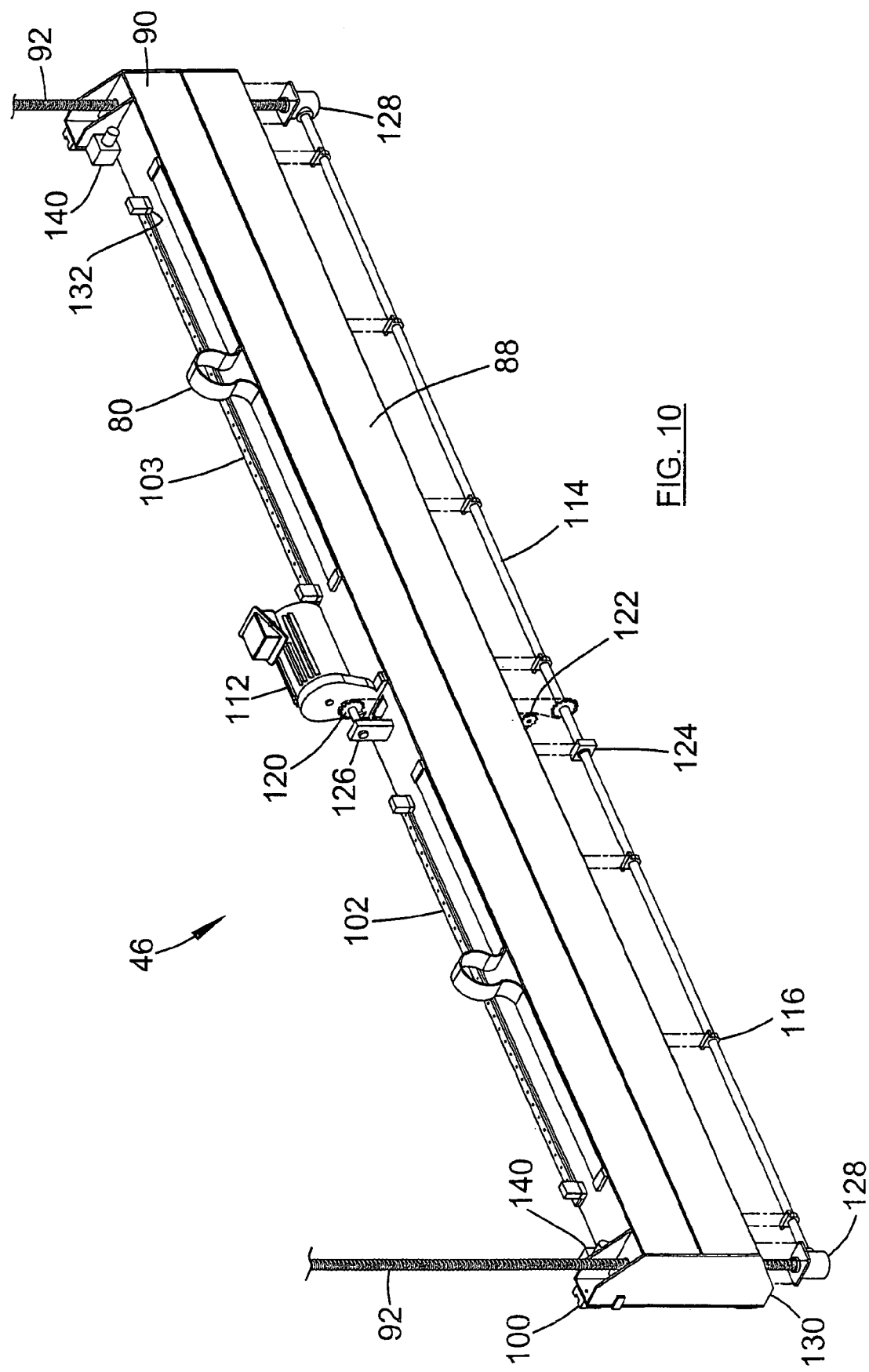
FIG. 10 is a perspective view of the support beam used in the transfer system, this view being taken from above and showing the front and left end of the beam.
Figure 11:
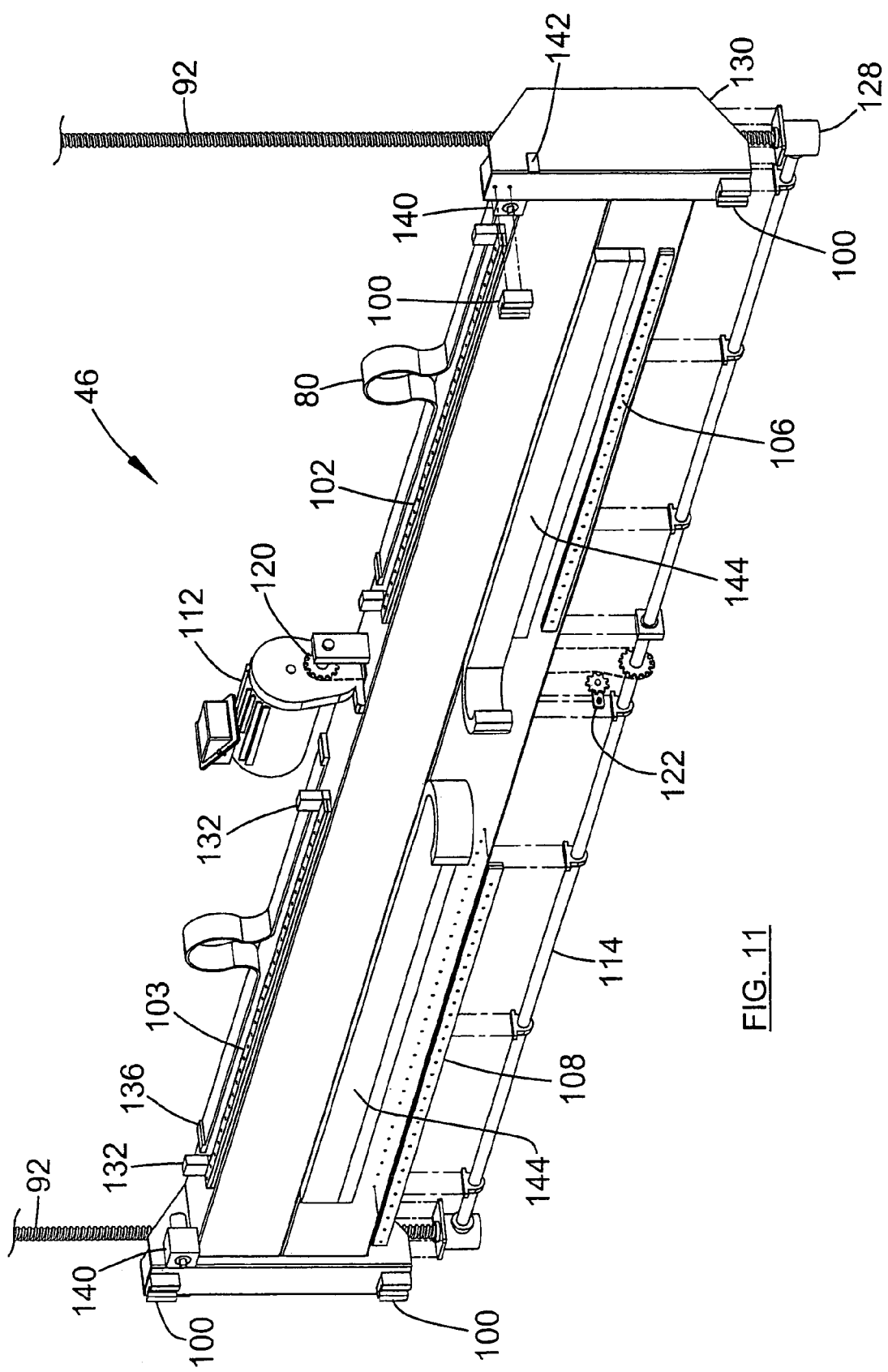
FIG. 11 is another perspective view of the support beam of FIG. 10, this view being taken from above and showing the rear and left end of the beam.

The construction of and vertical drive for each of the support beams will now be described with particular reference to FIGS. 10 and 11. As each of the support beams 46, 48 is constructed in a similar manner, it will be sufficient to describe the front support beam 46 herein. In particular, the preferred support beam is constructed from two elongate steel tubes 88 and 90. In one preferred embodiment, these tubes have a square transverse cross-section measuring 12 inches by 12 inches. Holes are formed in each end of the beam for passage of a jackscrew 92 which is part of the aforementioned vertical drive unit. As indicated, each jackscrew is mounted on and is supported by its respective post 44. The use of jackscrew drive assemblies to move a horizontal beam in a transfer system vertically is known per se in the transfer art. It will be understood that a jacking mechanism is mounted in each end of the beam and the screw jack of this mechanism rotatably engages the threads of the jackscrew 92 in a known manner. In this way, rotation of the screw jack will cause it to move upwardly or downwardly on the jackscrew along with its respective end of the support beam. The mounting of each jackscrew includes a bottom support bracket 94 connected to the bottom of the respective post 44 and an upper support bracket 96 visible in FIGS. 4 and 5. Extending between these support brackets is a vertical rail 98 which guides the vertical movement of the adjacent end of the support beam. This rail is attached by a series of screws to the front face of the post 44. A couple of ball slides 100 which are vertically aligned are mounted at each end of the support beam and slidably engage their respective rail 98. A gear motor 112 is used to rotate each of the screw jacks mounted in the beam. This gear motor is mounted centrally on top of the beam. By means of a double link chain the gear motor 112 is able to rotate a single long drive shaft 114 that extends substantially the length of the support beam and is below the beam. This drive shaft is supported by seven pillow blocks 116, each of which is connected to the bottom of the beam. In FIGS. 10 and 11, these blocks are shown separated from the beam for illustration purposes only. The chain is supported at the top by a sprocket located at 120, this sprocket being rotated by the gear motor 112. A chain tensioner assembly 122 is located near the centre of the drive shaft 114 and can be used to maintain the chain at the correct tension level. Located adjacent the tensioner assembly is a bushing 124. An additional bushing 126 is provided to support the chain sprocket and the drive shaft connected thereto. Shaft couplings 128 are provided at opposite ends of the drive shaft 114. These standard couplings operatively connect the drive shaft to the jacking mechanism so that rotary motion of the drive shaft is transmitted to the screw jacks. It will be appreciated that because a single drive shaft turns both of the screw jacks, the support beam will always be raised or lowered at the same rate at both ends. Also, at each end of the beam there is an end section 130 formed of right angle brackets.

Also mounted on top of each support beam are two elongate guide rails 102 and 103, one for each of the mounting heads. These are used to guide the horizontal movement of the mounting heads on the beam and ball slides 104 engage these rails (see FIGS. 12 and 13). Additional guide rails 106 and 108 are mounted on the rear of the support beam to provide additional guidance for and support for each mounting head. In FIG. 11 the guide rail 108 on the left side is shown detached from the support beam for illustration purposes only. These guide rails are each engaged by two ball slides 110 shown in FIGS. 12 and 13.

Other preferred features shown in FIGS. 10 and 11 include a hard stop block 132 at each end of each of the guide rails 102, 103, this block being provided to limit the horizontal movement of the mounting head. Also, at each of these blocks is a rubber bumper to provide a soft contact surface for limiting the movement of the mounting head. Two drive belts 80 are mounted on top of the beam and belt tensioners 136 of standard construction are provided for each belt. Each end of the belt is secured in place using the belt tensioner which is mounted on the beam by means of suitable screws and washers. Also mounted on the top of the beam is a shot pin assembly 140. The assembly 140 can be pneumatically operated and it is used to secure the end of the beam 46 in place when it is moved to its uppermost position by the jackscrews. In other words, the assembly 140 is used to park the beam. The shot pin can be moved out by pressurized air to engage a holding block-mounted on the press. For controlling the up and down movement of the beam, proximity sensors can be mounted at each end of the beam at 142. In addition, located adjacent the rear surface of the beam are two X-axis cable tracks 144 which can be supported by two plastic wear bars located along bottom edges of the tracks and mounted horizontally on the beam. These bars preferably measure 2"×2"×6 feet long approximately.

Turning now to the portion of each mounting head illustrated by FIGS. 12 and 13, each mounting head includes the illustrated carriage assembly 148 that is mounted for horizontal movement on its respective support beam. Another major component of the mounting head is a supporting body 150 which is illustrated separately in FIGS. 15 to 17. It will be understood that the supporting body 150 is mounted for vertical movement on the carriage assembly 148. Also, each of the aforementioned longitudinal transport drive systems 72, 74, 76 and 78 is connected to a respective one of the carriage assemblies 148 in order to move the carriage assembly in a left-right direction during use of the transfer system. The carriage assembly 148 is also referred to herein as the primary carriage body as it is directly mounted to the support beam. The preferred illustrated carriage body includes a substantially L-shaped support bracket 152 having a vertical leg 154 with two opposing vertically extending sides 155 and 156. The support body 150 is slidably mounted on the side 155 for vertical movement and the other side 156 is adapted for slidably connecting the carriage body to the support beam for horizontal movement (via ball slides 104 and 110). In order to slidably support the support body 150, there are mounted on the side 155 four ball slides 158.

The aforementioned drive motor 82 is mounted at the top of the carriage assembly 148 and optionally is equipped with a blower. The motor 82 can be a servo motor which is mounted on a straight gear-head 160 which in one preferred embodiment has a 10:1 ratio. One end of the gear-head housing is mounted by screws to vertical support plate 162. Mounted on the opposite side of this support plate is the aforementioned drive pulley 85 and pulley housing 84. Preferably the drive pulley is part of a tensioner pulley assembly 164 which includes, in addition to the drive pulley itself, two idler pulleys 166 each arranged below and on opposite sides of the drive pulley in a manner known per se. The assembly further includes the protective metal housing 84, including a top plate 170 and two end plates 172. The support plate 162 is connected rigidly to the main portion of the carriage assembly by bracing member 174. The pulley 85 is mounted on two bushings 87 and 89.

Projecting from the surface 155 is a support bracket 176 which includes horizontal support plate 178 having a hole formed centrally therein. Mounted on the plate 178 is the ballscrew drive assembly, the components of which are illustrated in FIGS. 14A and 14B. It is this ballscrew drive assembly 66 which provides the drive means to move the support body 150 (sometimes referred to herein as the secondary support body) vertically relative to the carriage assembly 148. Also visible in FIG. 13 is a short tubular support 180 having a rectangular opening 182 on one side and a larger rectangular opening 184 on the opposing side. The support 180 has one end of the X-beam cable track 144 connected to it so that the wires, cables, etc., extend through the opening 182 and then through the second opening 184.

Shown in FIG. 12 is a proximity flag 186 located at an outer corner of the horizontal leg 188 of the bracket 152. This sensor is used as a safety trigger to shut down the machine if the carriage assembly travels too far. Stop blocks 191 can be mounted near the top and bottom of the surface 155 to limit the vertical movement of the support body 150.

In order to strengthen the carriage assembly, the horizontal leg 188 can be made using steel tubes including relatively long tube 190 visible in FIG. 12. These can, for example, be two inch square tubes. The tube 190 can extend below the support plate 162 as well. The location of two additional short tubes are indicated in dash lines at 192 and 193. Mounting plates 195 for the two ball slides 104 can also be mounted on the bottom of the horizontal leg 188.

Figure 15:
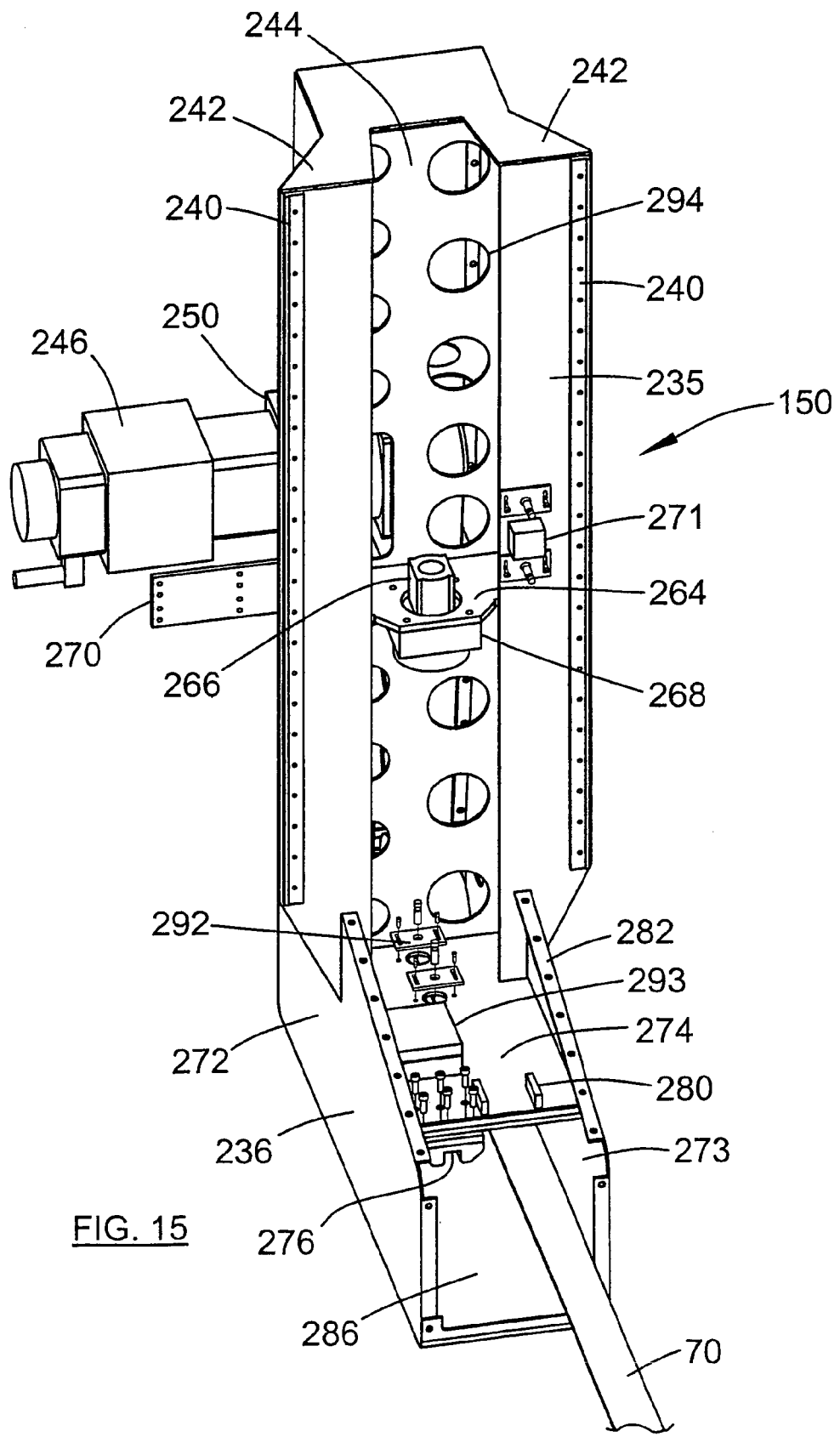
FIG. 15 is a perspective view of a right side supporting body of the mounting head, this view being taken from above and showing the beam facing side and left side of the supporting body.
Figure 16:
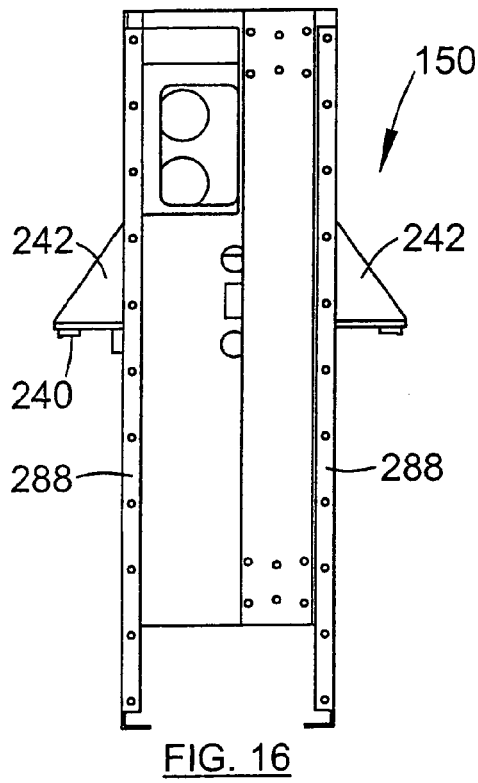
FIG. 16 is a bottom view of the supporting body with belt drive components omitted.
Figure 17:
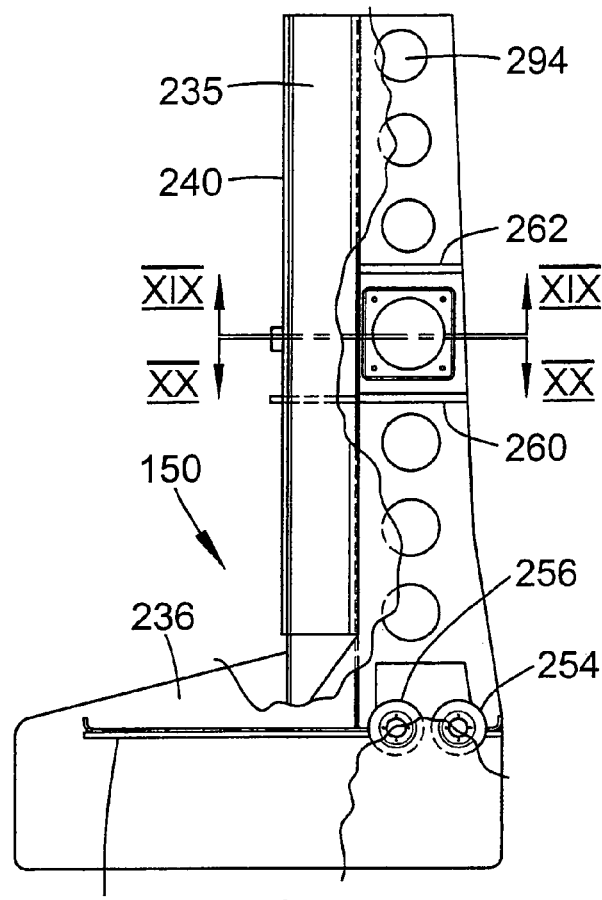
FIG. 17 is a right side view of the supporting body of FIG. 15.
Figure 20:
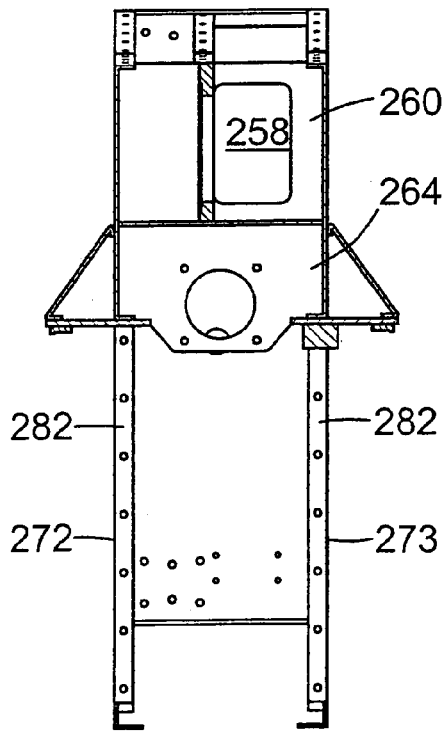
FIG. 20 is another detail cross-sectional view of the supporting body, this view being taken along the line XX—XX of FIG. 17.
Figure 19:
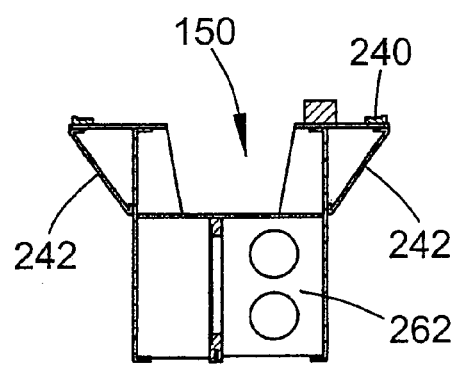
FIG. 19 is a detail cross-sectional view of the supporting body, this view being taken along the line XIX—XIX of FIG. 17.

Turning now to the vertical transport mechanism 66, this mechanism includes the ballscrew drive assembly shown in FIGS. 14A and 14B, which is used to move the support body 150 shown in FIGS. 15 to 17 in the vertical direction on the carriage assembly. This assembly includes a servo motor 196 which optionally is equipped with a blower and is of standard construction. The servo motor is operatively connected to servo coupling 198. A short distance down from the 90 degree gearhead 199 is coupling housing 200 which has a mounting plate 202 at one end and a removable cover 204 on one side. The mounting plate 202 is attached by six cap screws to horizontal support plate 178 of the carriage assembly. A bearing housing is provided at 206 and is connected to a mounting plate 207. A fail safe brake of known construction is provided at 208 and it can be mounted by means of four cap screws 210 to the support body 150. This brake engages automatically in the event of a power failure. A threaded ballscrew 212 extends downwardly through the brake and is rotatably mounted by bearings in the housing 206. A spline hub is provided at 214 and it is fixed to the ballscrew and above this hub is a bearing spacer 216. The spline hub is part of the brake system. Above the spacer is a seal 218 and above the seal is a tapered roller bearing 220. Above this space bearing is a Boston collar clamp 222 and above this clamp is another bearing spacer 224. Above this spacer is a second tapered roller bearing 226 and shown above this bearing is a bearing lock nut 228. Shown between the coupling 198 and the mounting plate 202 are a bearing lock washer 230 and a pre-loaded ring bearing 232. As ballscrew drive assemblies of this type are well known in the art of automated machines, a further description of this assembly herein is deemed unnecessary.

Figure 18:
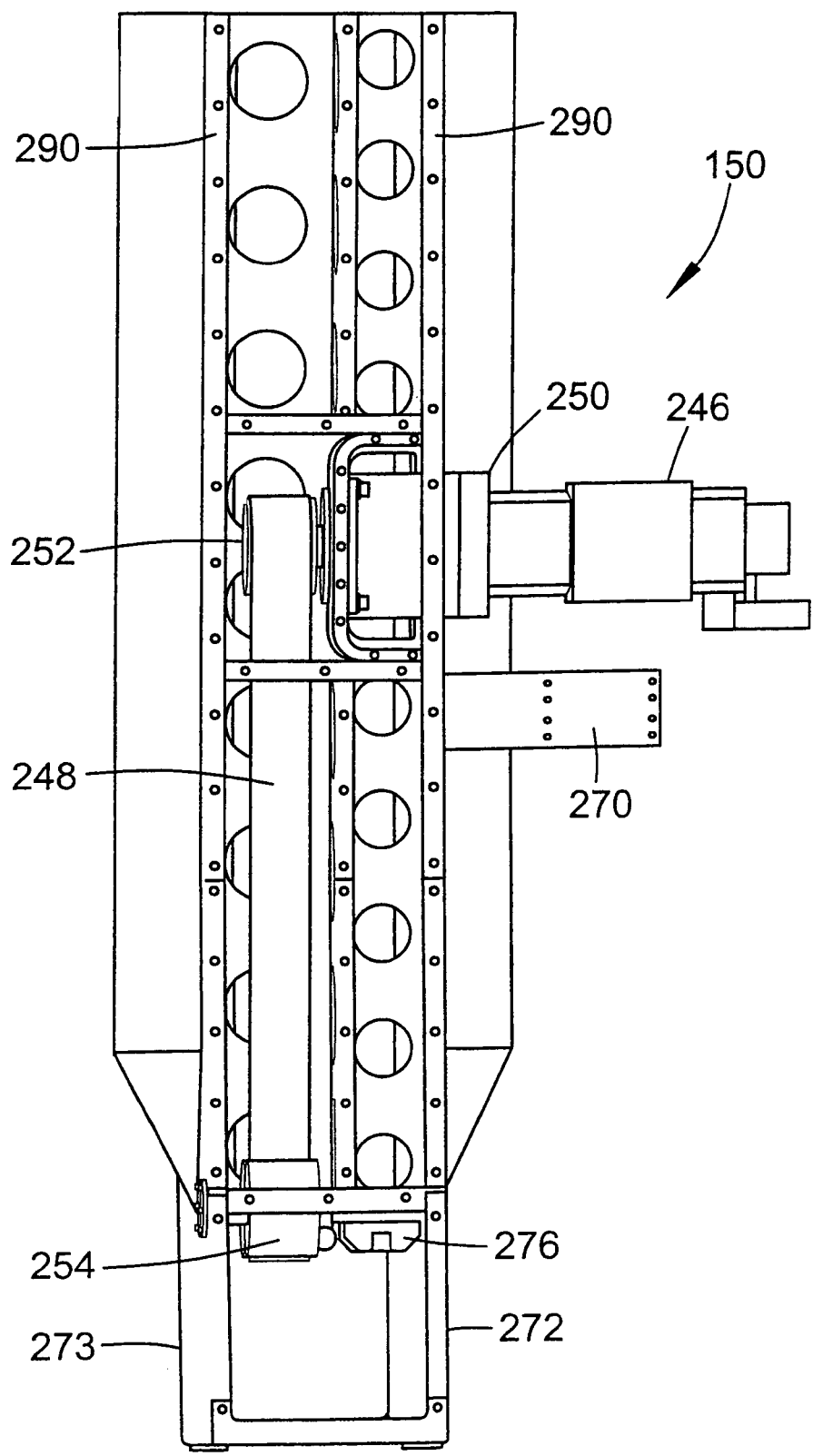
FIG. 18 is an elevational view of the supporting body, the illustrated side being that facing away from the support beam, this view showing a belt drive motor mounted on one side.

Turning now to the construction of the support body 150 illustrated by FIGS. 15 to 20, this support box which can also be referred to as a Z-box assembly since it enables movement in the vertical direction, is preferably in the form of a L-shaped housing having a vertical housing section 235 and a horizontal housing section 236 rigidly connected to each other. The aforementioned lateral transfer mechanism 68 includes a horizontally extending, elongate support member 238 (also referred to as the Y-slide), the preferred form of which is illustrated by FIGS. 21 to 24. The support member 238 is mounted for substantially horizontal movement on the support body 150 and, in particular, it is slidably mounted in the horizontal housing section 236. FIG. 15 shows the back side of the support body 115, that is the side facing towards the support beam while FIG. 18 shows the front side. Extending along edges of the back side are two guide rails 240. These are mounted on outwardly projecting extensions 242 formed along opposite vertical sides of the housing section 235. Located between these two extensions is a vertically extending, central recess or channel 244. It will be understood that the guide rails 240 cooperate in a sliding manner with the ball slides 158 on the carriage assembly. Mounted on one side of the housing section 235 is a servo motor 246, optionally one equipped with a blower for cooling purposes. This servo motor is part of the aforementioned lateral transport mechanism 66 used to move the coupling in a front-back direction and it engages the drive belt 70 in a manner which is clearly visible in FIG. 7. The servo motor is operatively connected to and mounted on a straight gearhead 250. Through the gearhead, the servo motor is able to rotate in a controlled manner a drive pulley 252. The drive belt extends around this pulley and downwardly to two further pulleys 254, 256, both of which can be seen in FIG. 7. Front and rear lengths of the drive belt extend through a rectangular opening 258 shown in FIGS. 7 and 20. This opening is formed in horizontal plate 260. Located above this plate is another horizontal support plate 262 which can be formed with two circular holes for weight reduction purposes. Located at about the same height as the plate 260 is another horizontal support plate 264 on which a ball nut 266 is mounted. It will be appreciated that the aforementioned ballscrew 212 extends through this ball nut and by this engagement the support body 150 can be moved upwardly or downwardly. An adaptor plate 268 is arranged below the plate 264. Also visible in FIGS. 15 and 18 is a bracket 270 for a cable track used to provide power to the support body and a stop block 271 to limit the up and down movement of the support body.

Figure 6:
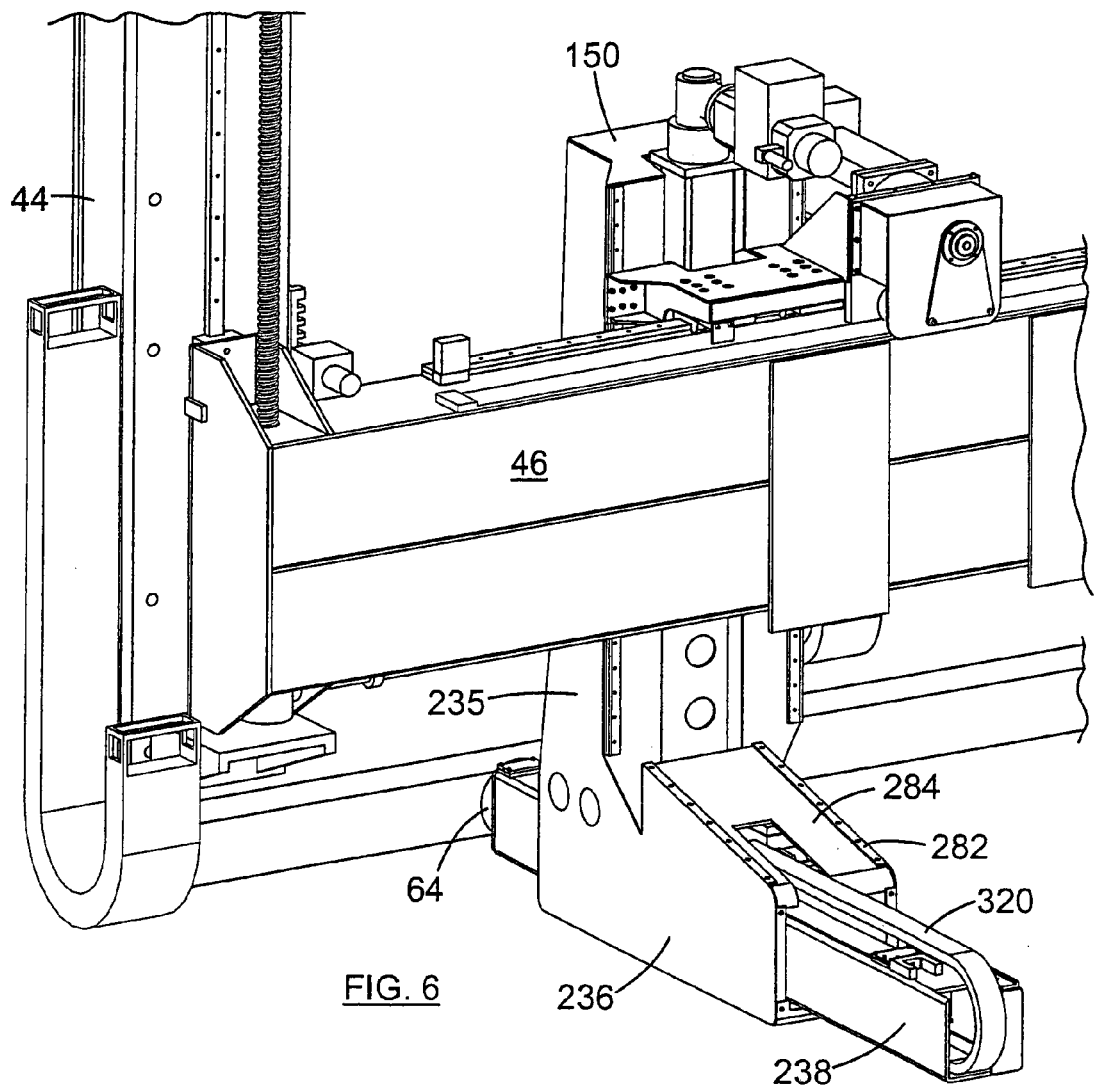
FIG. 6 is a detail view in perspective showing a mounting head arranged on a horizontally extending support beam, only a portion of which is shown, this view being taken from above and showing the elongate transfer bar connected to the mounting head for left-right part flow.
Figure 7:
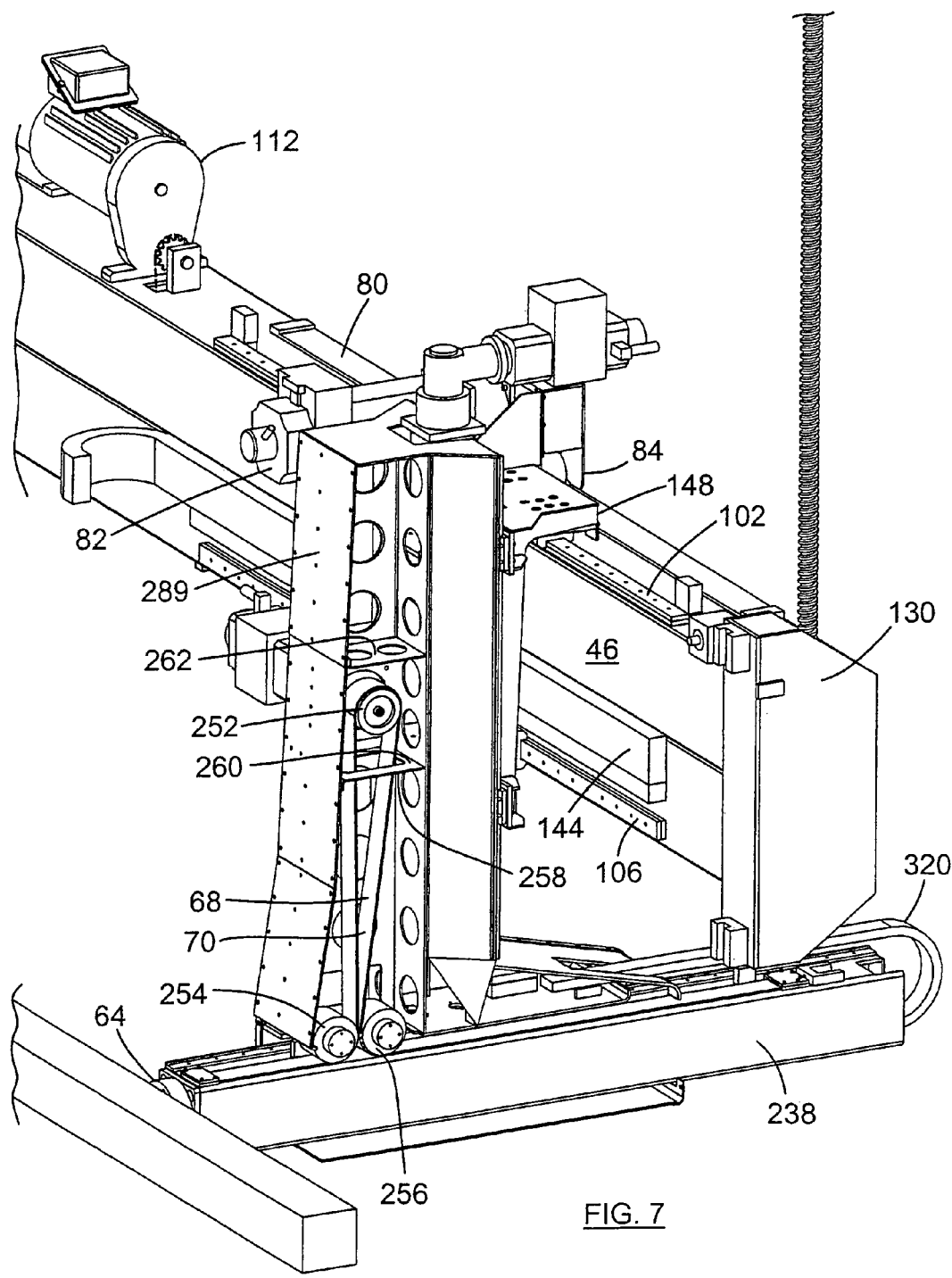
FIG. 7 is another detail view in perspective showing a mounting head and a portion of its support beam, with the mounting head having a side panel removed to illustrate the interior of the head and the belt drive assembly arranged therein.

The horizontal housing section 236 has two vertical sidewalls 272 and 273 and extending between these two sidewalls is a horizontal connecting plate 274. Mounted on the bottom of this plate are two aligned ball slides 276 that are used to slidably mount the support member 238. The slides engage a guide rail 278 that extends the length of the support member. Mounted on top of the plate 274 is a cable track spacer 280. Connecting flanges 282 extend along the top edges of the side walls 272, 273 and these can be used to detachably mount a cover plate 284 visible in FIG. 6. There can also be a bottom cover 286 which is detachably connected by means of connecting flanges 288 that extend along the bottom edges of the sidewalls 272, 273. A front cover plate 288 for the support body is shown in FIG. 7 and it is connected by means of front connecting flanges 290 shown in FIG. 18.

Also shown in FIG. 15 is a sensor mounting plate 292 on which a safety sensor or switch is mounted for sensing if the support member 238 has moved too far and sending a warning signal to the electronic control. In order to reduce the overall weight of the support body 150 and to provide ventilation to the drive belt and its drive pulley, a number of circular apertures 294 can be provided in the sidewalls of the vertical housing section 235 as shown. Beside the plate 292 is a junction box 293 which is an electrical connection point for sensor and electrical power cables that come from the cable track and terminate at this junction box.

Turning now to the construction of the elongate support member or tubular member 238 illustrated in FIGS. 21 to 24, this member can also be referred to as a Y-slide since it provides horizontal motion in the Y-axis direction. The particular support member 238 shown is for the left side mounting head on each support beam but it will be understood that the right side support member is constructed in a similar manner. Mounted on top of the support member is a fixed belt clamp 296 which is attached by four cap screws and which is used to hold one end of the drive belt 248 that is used to move the support member horizontally in the Y-axis direction. A belt tensioner 298 is positioned near the outer end 300 of the support member. By means of this tensioner, the position of the belt end can be adjusted so that the tension in the drive belt is at a desired operational level.

Two access openings 301 are provided in one side of the support member 238 and these openings are covered by means of rectangular cover plates 302 attached by suitable cap screws and washers.

Mounted at the inner end of the support member is a square end plate 304 having a large central opening 306. In the four corners of this plate are drilled four holes 308, which can be used for the passage of pneumatic lines to provide pressurized air to the grippers. Also, a number of screw holes 310 are formed about the circumference of the central hole 306 and these are used to attach the aforementioned coupling 64 which preferably is a pneumatically operated quick connect coupling, the construction of which is known per se. Although the illustrated coupling is preferred, it will be apparent that a variety of standard coupling devices could be used including nut and bolt fasteners, screws, etc. All of these possible fasteners are intended to be covered by the term "coupling" as used herein. The preferred coupling can be attached by screws using the holes 310 to the end plate 304. Mounted adjacent to the quick connect coupling is a pneumatic quick connect component 312 which is used to connect the pneumatic line to the transfer bar. At the opposite outer end 301 of the support member, there is a rectangular end plate which partially covers this end but leaves a relatively large rectangular opening 316. Through this opening extends a cable track 320 (see FIGS. 6 and 7) used to provide power and/or pressurized air to the transfer bar and its grippers 32. A cut out is also provided at 322 to accommodate this cable track. Preferably stops 324, 326 are provided on top of the support member 238 to limit the horizontal movement of the support member in the Y-axis direction.

One advantage of the preferred longitudinal transport drive system for each mounting head arises from its location, namely on top of the support beam 46 or 48. By locating the drive belt for this drive system completely on top of the support beam, the construction of the support beam is simplified and it can be constructed simply by means of two long tubular beam members as described.

The belt drive mechanism for moving the elongate support member 238 is also advantageous. A unique feature of this belt drive system is the location of the drive pulley which is located upwardly in the vertical housing section 235, well above the elongate support member 238 and its path of movement. This belt drive system is possible by mounting the servo motor 246 for the belt drive on the side of the vertical housing section in a manner which permits the attached drive pulley to rotate about a horizontal axis.

It will be appreciated that various modifications and changes can be made to the described transfer system without departing from the spirit and scope of this invention. Accordingly, all such modifications and changes as fall within the scope of the appended claims are intended to be included in and part of this invention.

What is claimed:

1. In a transfer system for transferring workpieces between successive die stations in a stamping press having a left side, a right side, a front side and a back side, and including at least one elongate bar having a series of workpiece grippers mounted thereon for engaging workpieces at the successive die stations, a primary support arrangement adapted for mounting adjacent said stamping press, two elongate support beams mounted on said primary support arrangement and positioned on first and second opposite sides of said stamping press during use of said transfer system, and two mounting heads mounted on each support beam and horizontally movable on their respective support beam, the improvement wherein each mounting head is independently movable on its respective support beam and is selectively connectible by means of one of said at least one elongate bar to either the other mounting head mounted on the same support beam for the purpose of transferring said workpieces in a left-right flow direction relative to said press or an opposing one of the mounting heads mounted on the other support beam for the purpose of transferring said workpieces in a front-back flow direction relative to said press, and wherein each mounting head includes a coupling for detachably connecting one of said at least one bar to the mounting head, a vertical transport mechanism for moving said coupling vertically, and a lateral transport mechanism for moving said coupling in a front-back direction relative to said press, and wherein said transfer system also includes longitudinal transport drive systems for moving each of said mounting heads in a left-right direction relative to said press.

2. The system of claim 1 wherein there are four of said longitudinal transport drive systems, one for each of said mounting heads and each longitudinal transport drive system comprises a belt drive assembly including a primary drive belt mounted on the support beam for the respective mounting head and extending in the lengthwise direction of this support beam and a drive motor mounted on its respective mounting head and having an output shaft operatively connected to a drive pulley that engages said primary drive belt.

3. The system of claim 1 wherein each vertical transport mechanism includes a supporting body mounted for vertical movement relative to its respective support beam and each lateral transport mechanism includes a horizontally extending, elongate support member mounted for substantially horizontal movement on said supporting body.

4. The system of claim 3 wherein said supporting body is a L-shaped housing having a vertical housing section and a horizontal housing section rigidly connected to each other, said elongate support member is slidably mounted in said horizontal housing section, and said lateral transport mechanism includes a lateral belt drive assembly including a lateral drive belt connected to said elongate support member and a drive motor mounted on said supporting body and having an output shaft operatively connected to a drive pulley that engages said lateral drive belt whereby, during use of said transfer system, rotation of said drive pulley causes said support member to move in the front-back direction.

5. The system of claim 3 wherein each mounting head includes a carriage assembly mounted for horizontal movement on its respective support beam, said supporting body is mounted for vertical movement on said carriage assembly, and each of said longitudinal transport drive systems is connected to a respective one of the carriage assemblies in order to move the one carriage assembly in a left-right direction during use of said transfer system.

6. The system of claim 5 wherein each longitudinal transport drive system comprises a primary belt drive assembly including a primary drive belt mounted on the support beam for the respective mounting head and extending in the lengthwise direction of this support beam and a primary drive motor mounted on its respective carriage assembly and having an output shaft operatively connected to a primary drive pulley that engages said primary drive belt.

7. The system of claim 6 wherein each of said support beams is vertically movable on said primary support arrangement and said system includes a vertical drive unit at each end of each support beam for moving its respective support beam upwardly or downwardly as required.

8. The system of claim 7 wherein said primary supporting arrangement comprises four vertical, elongate beam-supporting posts each adapted for mounting to or adjacent to said stamping press, each end of each support beam is movably mounted on a respective one of said beam-supporting posts, and each vertical drive unit is mounted on a respective one of said beam-supporting posts.

9. The system of claim 4 wherein each drive motor is mounted on its respective vertical housing section at a location spaced above said horizontal housing section, and said drive pulley is rotatable about a horizontal axis.

10. The system of claim 1 including first and second pairs of said at least one elongate bar, the first pair of bars being substantially longer than the second pair and each of the first pair being adapted to connect the two mounting heads on a respective one of said support beams, the bars of said second pair each being adapted to connect an opposing pair of the mounting heads mounted on said support beams, wherein during use of the transfer system either said first pair of bars can be used for transferring said workpieces in a left-right flow direction or said second pair of bars can be used for transferring workpieces in a front-back flow direction.

11. A transfer system for transferring workpieces between successive die stations in a stamping press having left and right sides, a front side, and a back side, said transfer system comprising: a substantially horizontal support beam adapted for placement adjacent one of the sides of the press; a supporting structure for said support beam, which is adapted for mounting on said supporting structure; at least one mounting head mounted on said support beam for horizontal movement along said support beam, the or each mounting head including a coupling for detachably connecting an elongate bar to the mounting head, said bar being adapted to mount a series of workpiece holders for engaging workpieces at the successive die stations, a lateral transport mechanism for moving said coupling in a front-back direction relative to said press, and a vertical transport mechanism for moving said coupling vertically; said transfer system also having a longitudinal transport drive system for the or each mounting head capable of moving the or each mounting head independently of any other mounting head, if any, in a left-right direction relative to said press, wherein said vertical transport mechanism includes a supporting body mounted for vertical movement on said support beam and wherein said lateral transport mechanism includes a horizontally extending, elongate support member mounted for substantially horizontal movement on said supporting body.

12. A transfer system according to claim 11 wherein said supporting body is a L-shaped housing having a vertical housing section and a horizontal housing section rigidly connected to each other, said elongate support member is slidably mounted in said horizontal housing section, and said lateral transport mechanism includes a lateral belt drive assembly including a lateral drive belt connected to said elongate support member and a drive motor mounted on said supporting body and having an output shaft operatively connected to a drive pulley that engages said drive belt whereby, during use of said transfer system, rotation of said drive pulley causes said support member to move in the front-back direction.

13. A transfer system according to claim 11 wherein the or each mounting head includes a carriage assembly mounted for horizontal movement along said support beam, said supporting body is mounted for vertical movement on said carriage assembly, and said longitudinal transport drive system is connected to said carriage assembly in order to move the mounting head in a left-right direction during use of said transfer system.

14. A transfer system according to claim 13 wherein said longitudinal transport drive system comprises a belt drive system including a primary drive belt mounted on said support beam and extending in the lengthwise direction of the support beam and a drive motor mounted on said carriage assembly and having an output shaft operatively connected to a drive pulley that engages said primary drive belt.

15. A transfer system according to claim 13 wherein said supporting structure comprises two vertical, elongate supporting assemblies, a respective one of which is arranged at each end of said support beam, said support beam is mounted for vertical movement on the two supporting assemblies, and a vertical power drive arrangement is provided for moving said support beam vertically on said two supporting assemblies.

16. A transfer system according to claim 12 wherein said drive motor is mounted on said vertical housing section at a location spaced above said horizontal housing section, said drive pulley is rotatable about a horizontal axis, and said lateral drive belt has a vertical belt section located within and extending along said vertical housing section.

17. A transfer system according to claim 11 wherein there are two of said at least one mounting head, the two mounting heads are mounted on said support beam for horizontal movement along said support beam, and the transfer system includes said elongate bar which extends between and is connected to both of said mounting heads, said mounting heads being movable together and in the same manner during use of said transfer system.

18. A transfer system according to claim 11 wherein there are two of said at least one mounting head, the two mounting heads are mounted on said support beam and are adapted for independent horizontal movement along said support beam, and said longitudinal transport drive system comprises two longitudinal drive assemblies each including a primary drive belt mounted on the support beam and extending in the lengthwise direction of the support beam and a drive motor mounted on its respective mounting head and having an output shaft operatively connected to a drive pulley that engages its respective primary drive belt.

* * * * *